United States Patent [19]

Szlam et al.

[11] Patent Number: 4,894,857

[45] Date of Patent: Jan. 16, 1990

[54] METHOD AND APPARATUS FOR CUSTOMER ACCOUNT SERVICING

[75] Inventors: Aleksander Szlam, Norcross; James W. Crooks, Jr., Marietta, both of Ga.; Curtis G. Marks, Eden Prairie, Minn.; Charles L. Warner, II, Stone Mountain, Ga.

[73] Assignee: Inuentions Inc., Norcross, Ga.

[21] Appl. No.: 287,008

[22] Filed: Dec. 20, 1988

Related U.S. Application Data

[63] Continuation-in-part of Ser. No. 62,944, Jun. 16, 1987, Pat. No. 4,797,911.

[51] Int. Cl.$^4$ .................. H04M 1/276; H04M 11/00
[52] U.S. Cl. ........................................ 379/67; 379/84; 379/92; 379/216; 379/246
[58] Field of Search .................. 379/67, 69, 84, 88, 379/92, 127, 216, 246

[56] References Cited

U.S. PATENT DOCUMENTS

| | | | |
|---|---|---|---|
| 3,989,899 | 11/1976 | Norwich | 379/134 |
| 4,320,256 | 3/1982 | Freeman | 379/73 |
| 4,406,925 | 9/1983 | Jordan et al. | 379/93 |
| 4,438,296 | 3/1984 | Smith | 379/69 |
| 4,451,700 | 5/1984 | Kempner et al. | 379/88 |
| 4,599,493 | 7/1986 | Cave | 379/247 |

Primary Examiner—Thomas W. Brown
Attorney, Agent, or Firm—Jones, Askew & Lunsford

[57] ABSTRACT

A method and an apparatus for retrofitting and extending or upgrading an existing customer account servicing system to provide for automated handling and processing of both incoming and outgoing calls. A mainframe computer or host (16) contains customer or potential customer account records. A plurality of operator terminals (12) allow the operators to converse with the called or calling party and make changes to the customer account information via a data terminal (12a4). A system controller (11), trunk interface unit (10), operator terminals (12) and cross-point switch or PBX (13) provide a retrofit to an existing system, a mainframe computer (16), to provide for automated handling and processing of both incoming and outgoing calls. The system controller (11) and terminals (12) use the same command and data format structure as that already in use by the existing system and software or programs of mainframe (16). The system controller (11) is transparent to the operation of the mainframe (16) and the operator terminals (12) and allows the system to be upgraded without the necessity of purchasing different software or programs for the mainframe (16). This invention is useful with both new and previously existing operator terminals (12). The system controller (11) monitors and handles both incoming and outgoing calls via the trunk interface units (10) and, when appropriate, causes the cross-point switch or PBX (13) to connect a selected trunk line (T) with an appropriate available operator terminal (12) and causes the customer account record to be displayed on the screen of the operator terminal.

68 Claims, 9 Drawing Sheets

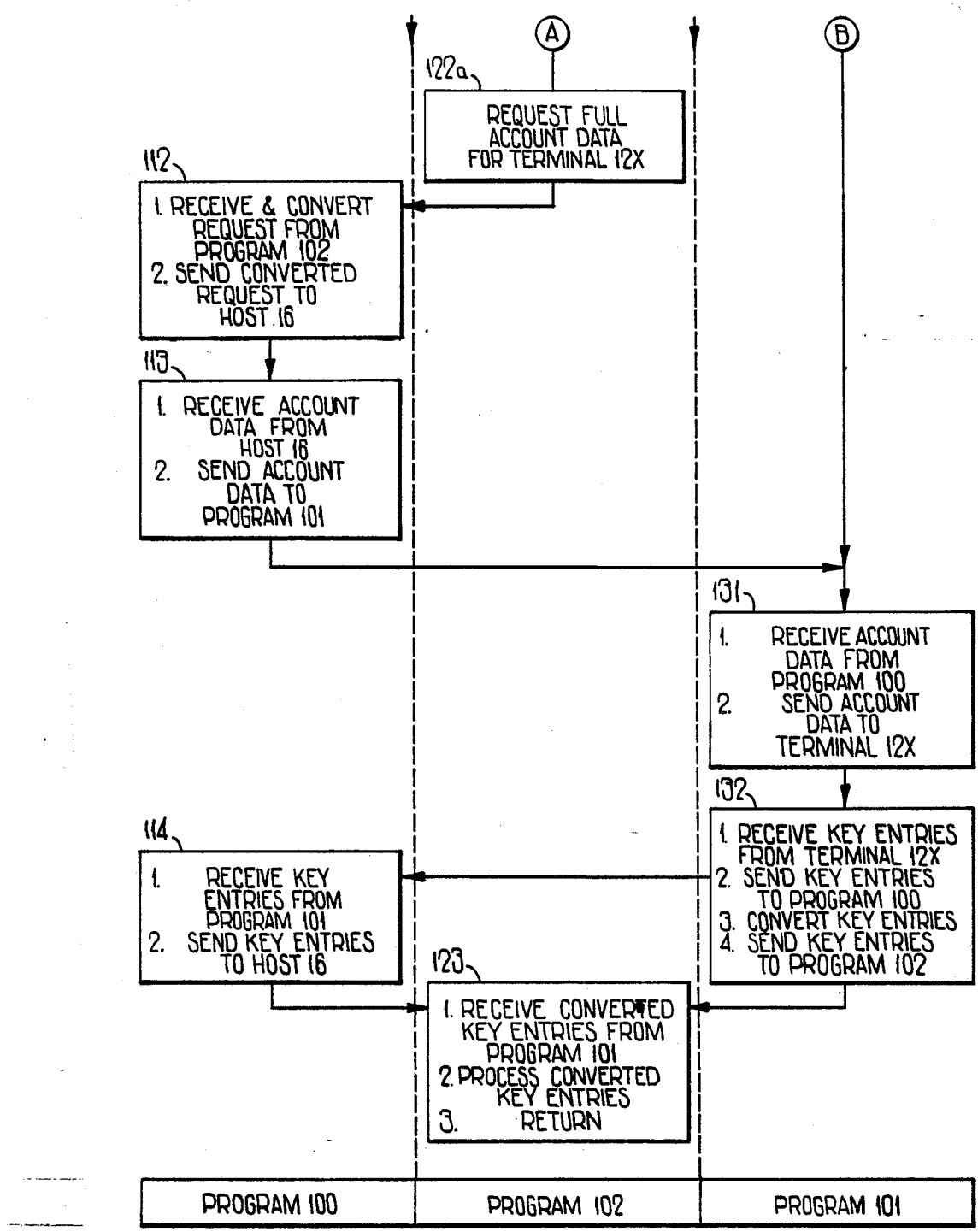
FIG 5B2

METHOD AND APPARATUS FOR CUSTOMER ACCOUNT SERVICING

This is a continuation-in-part of U.S. patent application Ser. No. 062,944, filed Jun. 16, 1987, by Szlam et al., entitled "Customer Account Online Servicing System", now U.S. Pat. No. 4,797,911, issued Jan. 10, 1989.

TECHNICAL FIELD

The present invention relates to customer account servicing systems in general and in particular to a method and apparatus for retrofitting existing systems to provide for the automated placement of telephone calls and the servicing of customer accounts.

BACKGROUND OF THE INVENTION

Many businesses, especially those with large numbers of customer accounts, periodically contact the customer by telephone to obtain updated account information, remind the customer of a past due account, collect on delinquent accounts, or conduct other business. In some installations, the operator sees a telephone number upon a screen and the number is either manually dialed by the operator or dialed by the operator's terminal in response to one or more keystroke inputs by the operator. The operator must then wait to determine if the call is answered, the call number is busy, is out of service, or has been changed, or to determine if there is no answer. For each call placed, there may be an elapsed time of several minutes wherein the operator is looking at the screen, dialing the number or causing the number to be dialed, and waiting for a response from the called number, which causes a significant part of the operator's time to be spent on nonproductive tasks. Therefore, there is a need for a method and an apparatus which automatically dials the call without operator intervention or control and only connects the operator and displays the customer account record, which is resident in the mainframe or host computer, if the call is answered.

U.S. Pat. No. 4,599,493 discloses a system which automatically performs the call dialing and call progress monitoring functions, thereby relieving the operator of the need to manually dial the telephone number and wait for a response from the called number. However, a system such as that disclosed by U.S. Pat. No. 4,599,493 requires that a customized interface program be written for the host computer. This arises because the dialing system must tell the host computer which telephone number has been called and which operator station has been selected for the audio connection so that the host computer can call up the record for the called number and transmit the record to the display of the selected operator. Applications software written for a host computer typically provides interface software so that the computer may exchange data with the operator terminals. However, the interface program generally does not include provisions for exchanging information with a dialing system such as that disclosed in U.S. Pat. No. 4,599,493. Of course, a customized applications program, including the necessary interface software, can be written but the cost of such a customized program is often prohibitive.

Therefore, there is a need for a method and apparatus which allows an existing customer account servicing system to be extended or upgraded to provide for automated dialing and call progress monitoring without the necessity of modifying an existing applications program or purchasing a customized applications program to accommodate the extended or upgraded system.

Also, the system disclosed in U.S. Pat. No. 4,599,493 only accommodates outgoing calls. U.S. patent application Ser. No. 062,944 discloses a system which can automatically process incoming calls, thereby relieving the operator of the need to answer the call, ascertain the identity and/or account number of the calling party, determine what business the calling party wishes to transact, etc. It would be beneficial if an existing system could be upgraded to provide for automatic handling and processing of incoming calls.

Therefore, there is a need for a method and apparatus which allows an existing customer account servicing system to be extended or upgraded for automated processing and handling of incoming calls without the necessity of purchasing a customized applications program or modifying an existing applications program to accommodate the upgraded system.

SUMMARY OF THE INVENTION

The present invention provides a method and apparatus for extending or upgrading an existing customer account servicing system to provide for automated handling of both incoming and outgoing calls in a manner that is completely compatible with the existing software of the servicing system.

More particularly described, the present invention provides a method and apparatus for upgrading an existing system to provide automatic dialing of telephone calls and call progress monitoring without the need for upgrading the host computer software.

More particularly described, in one embodiment the present invention performs the automated dialing and call progress monitoring functions while also functioning as a transparent interface between the host and the operator terminals.

Also more particularly described, the present invention provides a method and apparatus for upgrading an existing system to provide for the automatic handling and processing of incoming telephone calls without the need for upgrading the host computer software.

Also more particularly described, in one embodiment the present invention performs the automated incoming call detection, call answering, and initial contact with the calling party while also functioning as a transparent interface between the host and the operator terminals.

In another embodiment, the present invention, in addition to performing the automated dialing and call progress monitoring functions, causes the initiation of the data transfer between the host computer and the selected operator station.

Therefore, it is an object of the present invention to provide a method and apparatus whereby an existing system can be upgraded to accommodate automated dialing and call progress monitoring without requiring that the host computer software be changed.

It is another object of the present invention to provide a method and apparatus whereby an existing system can be upgraded to accommodate automated handling and processing of incoming calls without requiring that the host computer software be changed.

It is a further object of the present invention to provide a method and apparatus which automates the handling and processing of incoming and outgoing calls while also functioning as a transparent interface between the host and the operator terminals.

BRIEF DESCRIPTION OF THE DRAWINGS

FIGS. 5A and 5B1 are a flow chart of the operating programs of the preferred embodiment of the system controller.

FIGS. 5A and 5B2 are a flow chart of the operating programs of an alternative embodiment of the system controller.

DETAILED DESCRIPTION

Figure 1:
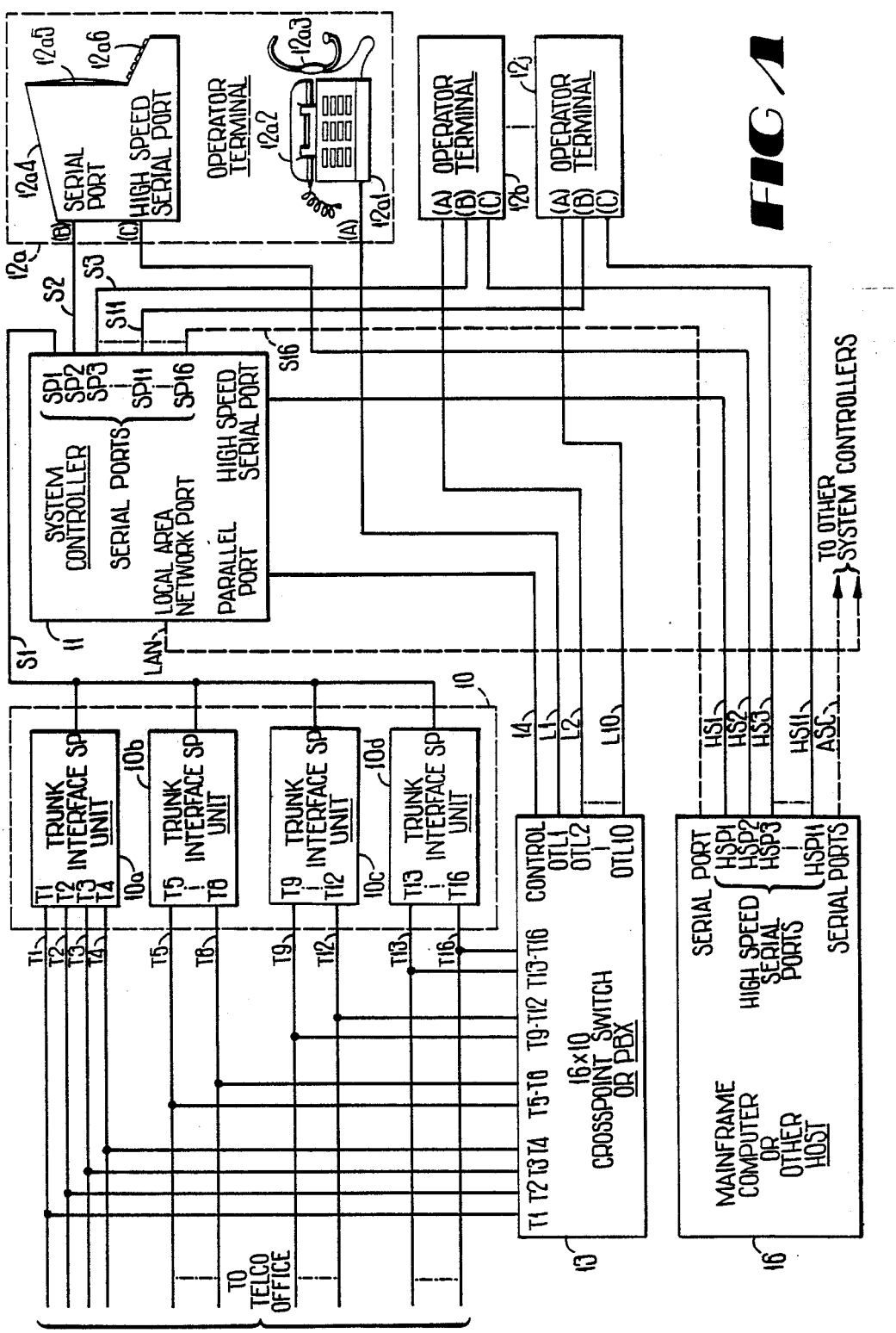
FIG. 1 is a block diagram of the preferred embodiment of the present invention.
Figure 6:
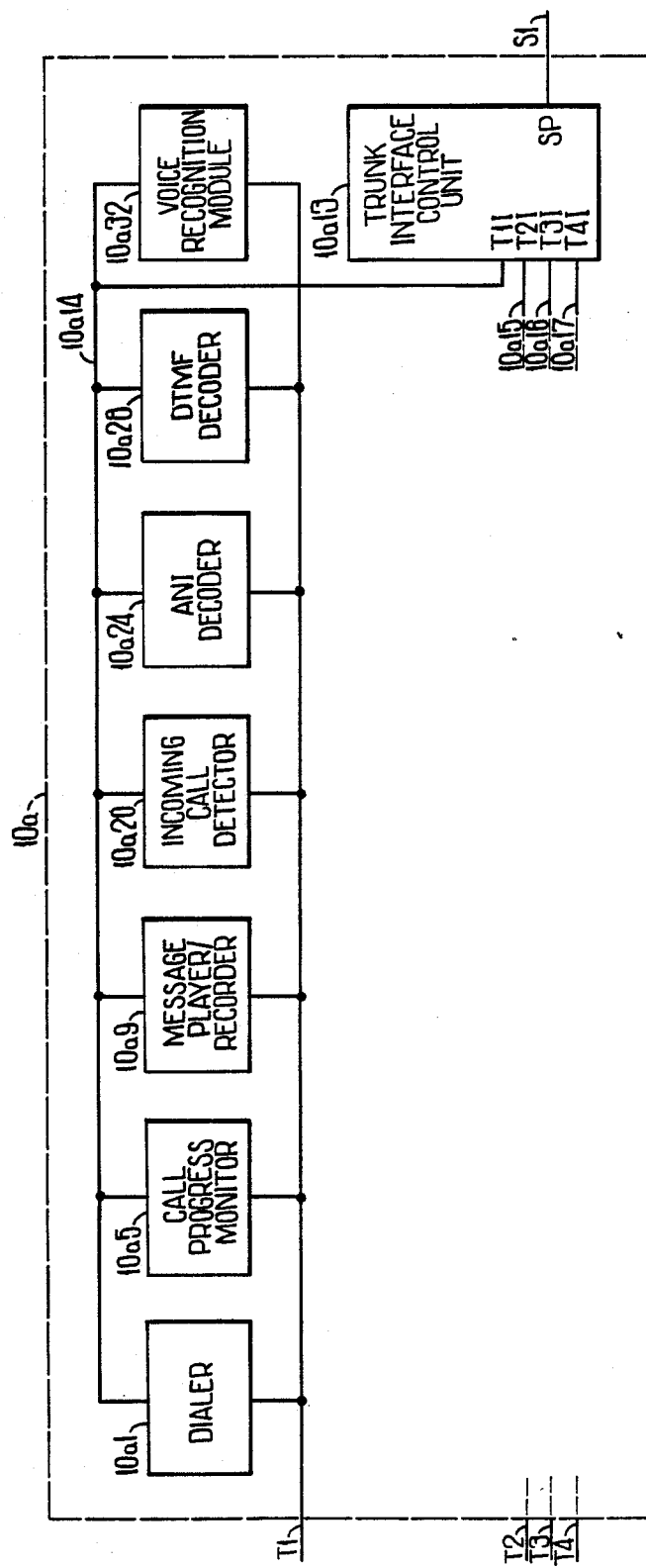
FIG. 6 is a block diagram of the preferred embodiment of a trunk interface unit.

Turn now to the drawing in which like numerals represent like components throughout the several figures. Furthermore, wherever appropriate, the numeral/component relationship is the same as that used in the above mentioned patent application Ser. No. 062,944, which is hereby incorporated herein by reference. FIG. 1 is a block diagram of the preferred embodiment of the present invention. The preferred embodiment comprises four trunk interface units 10a–10d, a system controller 11, a cross-point switch or PBX 13, a mainframe computer or host 16, and ten operator terminals 12a–12j. Sixteen trunk lines T1–T16 are connected to composite trunk interface unit 10 and cross-point switch 13. Each trunk interface unit 10a–10d accommodates four trunk lines so that trunk interface unit 10a services trunks T1–T4, trunk interface unit 10b services trunks T5–T8, and so forth. Each trunk interface unit 10a–10d performs one or more of the following functions: trunk seizure; dialing; call progress monitoring; message playing; message recording; voice recognition and analysis; automatic number identification; and/or dual tone multifrequency tone decoding. Referring briefly to FIG. 6, which is a block diagram of a trunk interface unit, it will be seen that a trunk interface unit, such as trunk interface unit 10a, preferably comprises a dialer 10a1, a call progress monitor 10a5, a message player and/or recorder 10a9, an incoming call detector 10a20, an automatic number identification (ANI) decoder 10a24, a dual tone, multifrequency (DTMF) decoder 10a28, a voice recognition module 10a32, and a trunk interface control unit 10a13. Details of the construction and operation of trunk interface units 10a–10d are explained in more detail in patent application Ser. No. 062,944. Returning to FIG. 1, the parallel port of system controller 11 is connected by parallel bus 14 to the control inputs of switch 13. It will also be appreciated that system controller 11 may control the operation of switch 13 through some other communication means or port, such as serial port SP15. The use of a serial port or a parallel port will, of course, be determined by the nature of the control input port of switch (or PBX) 13.

In the preferred embodiment, system controller 11 has 16 serial ports SP1–SP16, a parallel port, a high speed serial port, and a local area network port. Serial port SP1 of system controller 11 is connected to the serial ports (SP) of trunk interface units 10a–10d through a standard multi-line drop. Controller 11 may, of course, be connected to units 10a–10d through any appropriate communications means. Each trunk interface unit 10a–10d has an address different from any other trunk interface unit so that system controller 11 may, via port SP1 and trunk interface units 10a–10d, monitor the status of trunk lines T1–T16. System controller 11, via serial port SP1, also commands trunk interface units 10a–10d to perform a desired operation on a specified trunk T1–T16. For example, system controller 11 may command trunk interface unit 10a to seize trunk T1 and begin dialing a desired telephone number, command trunk interface unit 10a to begin playing a prerecorded message on trunk T2, and obtain information on the status of the trunks T1–T16. Also, the trunk interface units 10 may advise system controller 11 that a ringing signal (indicating an incoming call) is occurring on a particular trunk whereupon system controller 11 may command trunk interface units 10 to seize the trunk having incoming call, play a prerecorded message on that trunk, and evaluate the calling party's response to the prerecorded message. In the preferred embodiment, serial port SP1 is an RS-232C serial data port.

Operator terminal 12a, which is representative of operator terminals 12b–12j, has a telephone set 12a1, a handset 12a2, and/or a headset 12a3. Typically, a headset 12a3, and not handset 12a2, will be plugged into telephone 12a1 so as to free the operator's hands. It will be appreciated that, in environments in which headset 12a is always used, handset 12a2 may be eliminated. It will also be appreciated that, if the operator has no need to manually place outgoing calls, telephone set 12a1 may be replaced by a conventional trunk line-to-headset interface.

Operator terminal 12a also has a data terminal 12a4, data terminal 12a4 having a display screen 12a5 and a keyboard 12a6. Data terminal 12a4 has a serial port (B) connected by coaxial cable, or other data transfer means, S2 to the SP2 serial port of system controller 11 and a high speed serial port (C) connected by a cable, or other data transfer means, HS2 to a high speed serial port of computer 16. Data terminal 12a4 may also have other types of ports for data transmission and retrieval, such as a telephone port for use by an internal modem (not shown) or a port for connection to an external modem (not shown). Operator terminals 12b–12j are likewise connected by conductors S3–S11 to the SP3–SP11 serial ports of system controller 11 and cables HS3–HS12 to the high speed serial ports of host 16. Line outputs OTL1–OTL10 of switch 13 are connected by telephone lines L1–L10, respectively, to the telephone sets 12a1–12j1 via the telephone inputs (A) of operator terminals 12a–12j, respectively.

Although separate data cables (S2–S11, HS2–HS11) are shown for each data terminal it will be appreciated that all the (B) ports may be connected to one local area network serviced by, for example, cable S2, and that all the (C) ports may be connected to another LAN serviced by, for example, cable HS2 or cable HS1.

The high speed serial port of system controller 11 is connected by cable HS1 to a high speed serial port of mainframe computer (or other host) 16 to allow for file transfers and data manipulation. Alternatively, serial port SP16 of system controller 11 may be connected by cable S16 to a serial port of host 16 for this purpose. The local area network port of system controller 11 and the other serial ports of mainframe computer 16 may, if desired, be connected to other system controllers (not shown) via local area network cable LAN and additional serial cables ASC, respectively.

Batch mode transfer from computer 16 to system controller 11 is preferred but, if desired or required by the limitations of the applications software of mainframe computer 16, system controller 11 can obtain information from mainframe 16 one account at a time. Also, depending upon the previously installed program in host 16, system controller 11 may obtain full account information, abbreviated account information, or compilations of certain account information such as, for example, a calling list. System controller 11 coordinates and performs such functions as causing trunk interface units 10 to seize a trunk line, dial a customer telephone number, monitor the status of the outgoing call, detect an incoming call, answer an incoming call, play prerecorded messages and determine the response from the called/calling party, record a called/calling party's response, etc. These functions of system controller 11 and the manner in which they are implemented are described in more detail in Ser. No. 062,944.

In the preferred embodiment, system controller 11 and each data terminal 12a4–12j4 is an IBM-AT, an IBM PS/2 Model 30, 60, or 80, or other computer programmed and equipped to emulate an operator terminal which is designed to interface with mainframe computer 16 via a high speed serial port or other communications means. Furthermore, system controller 11 and data terminals 12a4–12j4 are programmed to use exactly the same commands and data formats that are required by the customer's applications package already resident in computer 16. This allows substantial enhancement of the incoming and outgoing call processing capability by providing automated dialing, call progress monitoring, automatic answering, routing of incoming and outgoing calls, etc., without requiring that the applications program or other software for mainframe computer 16 be changed in any way.

This also provides another advantage: operator training. If the operators are trained on one type of host applications program and terminal and have become accustomed to the commands used with that terminal and the displays provided at that terminal by the host applications program then, if the operator is provided with a new terminal which uses different commands and has a different screen display, there will be a period of substantially reduced productivity while the operator learns the particulars of the new data terminal. However, in the preferred embodiment the operator terminals replace and emulate the previously existing terminals so that the operator continues to use the same commands and procedures and still sees the same screen display as before. This substantially reduces or completely eliminates the period of reduced productivity. This also allows the data terminals 12a4–12j4 to communicate with host 16 using the commands, data formats and protocols that host 16 was previously programmed to use. The use of new data terminals 12a-4–12j4 which emulate the previously existing data terminals and host applications interface allow substantial enhancement of incoming and outgoing call processing capability without requiring that the applications program or other software for host 16 be changed in any way.

Therefore, the present invention provides for substantially upgrading and enhancing the performance of an existing mainframe 16 without requiring a change in the applications program or other software for the mainframe computer 16 or requiring that the operators undergo retraining to learn new commands and display formats.

Consider now the operation of the preferred embodiment. Mainframe computer 16 will provide, by a batch transfer or online transfer, the customer account information for a desired number of accounts to system controller 11. System controller 11 then extracts, for each account, the name of the customer, the customer's telephone number, the account number, and/or some type of mainframe database index number. Assuming that trunk T1 is available, then system controller 11 will direct trunk interface unit 10a to seize trunk T1, provide the customers telephone number to trunk interface unit 10a, and direct trunk interface unit 10a to dial the customer's telephone number. Trunk interface unit 10a dials the customer's telephone number and then monitors trunk T1 for the status of the call. If trunk interface unit 10a advises, via port SP, system controller 11 that the called number is busy, or is not answered, system controller 11 will mark, in its memory (not shown), the account accordingly and place the account in the queue to be tried again later. It will be appreciated that the memory associated with system controller 11 may be a semiconductor memory, such as RAM, or a disk memory system.

Assume now that the customer answers the call. Trunk interface unit 10a will automatically start a message player/recorder (FIG. 6) and advise system controller 11 that the call has been answered. If an operator is available, system controller 11 will send the abbreviated information (telephone number, customer name, account number, and/or database index number), to, for example, operator terminal 12a, direct cross-point switch 13, via bus 14, to connect trunk T1 to telephone 12a1 via line port OTL1, and then direct trunk interface unit 10a to release trunk T1 and stop the message player/recorder. The message player/recorder will then stop the message currently being played. The called party may never hear any part of the message since, if an operator is available, the operator will be immediately connected to the called party. Terminal 12a4 will display the abbreviated information on screen 12a5. Therefore, as soon as the operator at operator terminal 12a is connected with the customer on trunk T1, the operator has at least the abbreviated customer account information. If terminal 12a4 is a semi-smart terminal then the operator may obtain the full account information by pressing one or more keys on keypad 12a6 which causes terminal 12a4 to request the full account information from mainframe 16. Alternatively, if terminal 12a4 is a semi-smart terminal, then system controller 11 may instruct mainframe 16 to send the full account information to terminal 12a4 for display on screen 12a5.

If terminal 12a4 is a smart terminal then, upon receiving the abbreviated account information from system controller 11, terminal 12a4 may, without prompting from the operator, immediately request the full account information from mainframe 16. The result is that, with minimal or no effort by the operator, the customer has been called, the customer's answer has been detected, the operator has been connected to the customer, and the operator sees and can manipulate, on screen 12a5, the most current customer account information from mainframe 16. Therefore, the operator has not had to perform the inefficient and time consuming duties of requesting a telephone number, obtaining a trunk line, dialing the number, waiting for the party to answer, and obtaining current information on the customer account.

Once connected, the operator can then discuss the matter or reason for which the customer was called, for example, discussing a late payment account, collecting on a delinquent account, verifying an order, updating customer account information, etc., while being directly connected, online, to mainframe 16.

Assume now that when the party called on trunk T1 answered, an operator was not available. Trunk unit 10a starts the message player/recorder and advises system controller 11 that the called party has answered. After ascertaining that an operator is not available, system controller 11 will allow trunk interface unit 10a to continue playing the desired prerecorded message to the called party. As soon as system controller 11 determines that an operator is available, system controller 11 will cause cross-point switch 13 to connect the available operator terminal 12 to trunk T1, direct trunk interface unit 10a to release trunk T1, direct unit 10a to stop the message, advance to the next message, and send the abbreviated customer account information to the available operator terminal 12. Again, the operator will have the customer account information when the customer is connected and can then begin to discuss the reason for which the customer has been called.

In the preferred embodiment, when the operator at operator terminal 12a has concluded the business with the customer the operator may press a telephone trunk release key on keyboard 12a6 to indicate that trunk T1 should be released. Terminal 12a4 sends the trunk release signal over serial port B to system controller 11. System controller 11 then directs cross-point switch 13 to disconnect telephone 12a1 from trunk T1. System controller 11 then sends the next telephone number to trunk interface unit 10a and directs trunk interface unit 10a to seize trunk T1 and dial this next telephone number. If another called party has answered then system controller 11 will cause that called party to be connected to the now-available operator.

When the operator at operator terminal 12a has completed entering any new data for the particular customer account then the operator at terminal 12a may press a terminal release key on keyboard 12a6. Terminal 12a4 sends this information to system controller 11 which advises system controller 11 that the operator at operator terminal 12a is available for the next call. System controller 11 then causes cross-point switch 13 to connect the next customer to telephone 12a1 and sends the abbreviated customer account information to terminal 12a4 for display on screen 12a5. Therefore, as soon as the operator at operator terminal 12a has indicated that processing of one customer account is completed system controller 11 connects the operator with the next called party. The result is that the operator's time is more efficiently and more completely utilized.

Alternatively, a single key or single entry on keyboard 12a6 may indicate to system controller 11 that the connected trunk should be released and that the operator is available for the next customer.

From the above, it will be appreciated that the present invention relieves the operator of the inefficient and time consuming duties of obtaining the telephone number, dialing the telephone number, and waiting for the called customer to answer. Also, when either an incoming or an outgoing call requires operator assistance, that call is immediately connected to an available operator, thereby further reducing the idle time of the operators. Also, it will be appreciated that the customer account information in the main database in mainframe computer 16 is immediately updated so that, at the end of the business day, it is not necessary to consolidate changes made by the operator(s) to the customer account information and also provides the benefit that, at any time during the day when the customer calls or is called, the customer account information available to the operator is the current, updated customer account information.

It will also be appreciated that the operation of system controller 11 is transparent to the host 16 and to the operator. System controller 11 automatically processes each call and routes the call to the first available operator. Therefore, any changes to the customer account information made by the operator are immediately provided to mainframe 16, which automatically and instantly updates the customer account information. Furthermore, because of the automatic updating, any information provided to an operator is the most current information. The operator therefore appears to be directly connected to mainframe 16.

Although, in the preferred embodiment, system controller 11 sends only the abbreviated customer account information to an operator terminal 12, if system controller 11 has sufficient memory capacity, system controller 11 may retain the entire file for a customer account and send this entire record to the operator terminal, thereby eliminating the steps of sending the abbreviated account information to the operator terminal, sending the account number, telephone number, and/or database number to mainframe 16 and then sending the full account information from mainframe 16 to the operator terminal.

In an alternative embodiment of FIG. 1, no attempt is made to continue using an existing application program in host 16. That is, a new applications program may be installed in host 16 so that it is no longer necessary for system controller 11 or the data terminals 12 to emulate any particular data terminal. In this alternative embodiment the interaction between system controller 11, terminals 12, and host 16 is the same as previously described except that different command and data format structures may be used. This alternative embodiment also allows substantial enhancement of the incoming and outgoing call processing capability by providing automated dialing, call progress monitoring, automatic answering, routing of incoming and outgoing calls, etc. Therefore, it will be appreciated that the present invention is not limited solely to systems where the existing applications software of host 16 is to be used.

Figure 2:
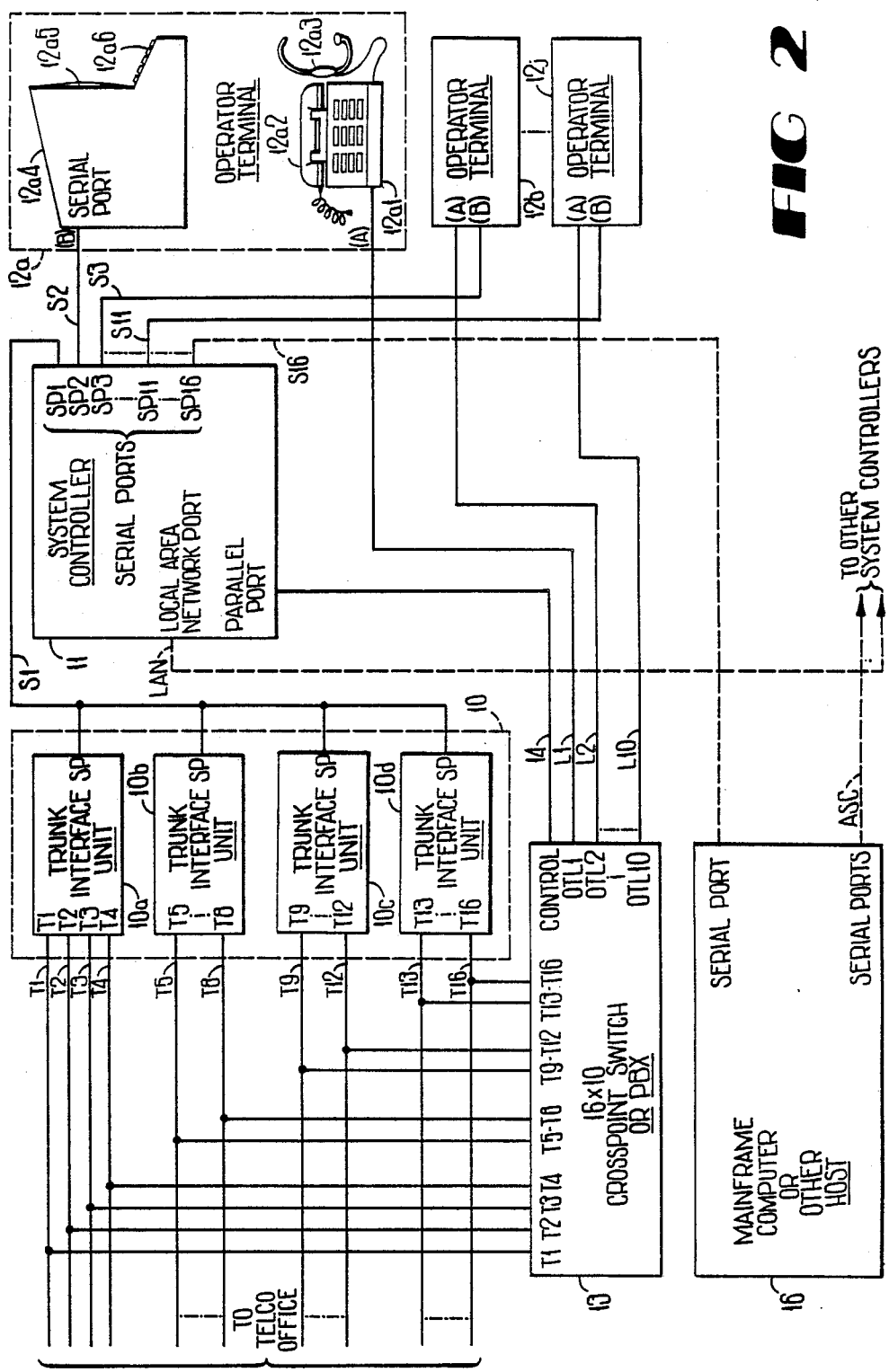
FIG. 2 is a block diagram of an alternative embodiment of the present invention.

Turn now to FIG. 2 which is a block diagram of an alternative embodiment of the present invention. In this alternative embodiment, system controller 11 has 16 serial ports SP1-SP16, a parallel port, and a local area network port. Serial port SP1 of system controller 11 is connected to the serial ports (SP) of trunk interface units 10a-10d through a standard multi-line drop. Controller 11 may, of course, be connected to units 10a-10d through any appropriate communications means. Each trunk interface unit 10a-10d has an address different from any other trunk interface unit so that system controller 11 may, via port SP1 and trunk interface units 10a-10d, monitor the status of trunk lines T1-T16. System controller 11, via serial port SP1, also commands trunk interface units 10a–10d to perform a desired operation on a specified trunk T1–T16. For example, system controller 11 may command trunk interface unit 10a to seize trunk T1 and begin dialing a desired telephone number, command trunk interface unit 10a to begin playing a prerecorded message on trunk T2, and obtain information on the status of the trunks T1–T16. Also, the trunk interface units 10 may advise system controller 11 that a ringing signal (indicating an incoming call) is occurring on a particular trunk whereupon system controller 11 may command trunk interface units 10 to seize the trunk having incoming call, play a prerecorded message on that trunk, and evaluate the calling party's response to the prerecorded message. Serial port SP1 is again an RS-232C serial data port.

In this alternative embodiment, operator terminals 12a–12j are the previously existing operator terminals. Operator terminal 12a, which is representative of operator terminals 12b–12j, has a telephone set 12a1, a handset 12a2, and/or a headset 12a3. Typically, a headset 12a3, and not handset 12a2, will be plugged into telephone 12a1 so as to free the operator's hands. It will be appreciated that, in environments in which headset 12a is always used, handset 12a2 may be eliminated. It will also be appreciated that, if the operator has no need to manually place outgoing calls, telephone set 12a1 may be replaced by a conventional trunk line-to-headset interface.

Operator terminal 12a also has a data terminal 12a4, data terminal 12a4 having a display screen 12a5 and a keyboard 12a6. Data terminal 12a4 has a serial port (B) connected by coaxial cable, or other data transfer means, S2 to the SP2 serial port of system controller 11. Data terminal 12a4 may also have other types of ports for data transmission and retrieval, such as a telephone port for use by an internal modem (not shown) or a port for connection to an external modem (not shown). Operator terminals 12b–12j are likewise connected by conductors S3–S11 to the SP3–SP11 serial ports of system controller 11. Line outputs OTL1–OTL10 of switch 13 are connected by telephone lines L1–L10, respectively, to the telephone sets 12a1–12j1 via the telephone inputs (A) of operator terminals 12a–12j, respectively.

Serial port SP16 of system controller 11 is connected by conductor S16 to a serial port of mainframe computer (or other host) 16 to allow for file transfer and data manipulation. The local area network port of system controller 11 and the other serial ports of mainframe computer 16 may, if desired, be connected to other system controllers (not shown) via local area network cable LAN and additional serial cables ASC, respectively.

Batch mode transfer from computer 16 to system controller 11 is preferred but, if desired or required by the limitations of the applications software of mainframe computer 16, system controller 11 can obtain information from mainframe 16 one account at a time. Also, depending upon the previously installed program in host 16, system controller 11 may obtain full account information, abbreviated account information, or compilations of certain account information such as, for example, a calling list. System controller 11 coordinates and performs such functions as causing trunk interface units 10 to seize a trunk line, dial a customer telephone number, monitor the status of the outgoing call, detect an incoming call, answer an incoming call, play prerecorded messages and determine the response from the called/calling party, record a called/calling party's response, etc. These functions of system controller 11 and the manner in which they are implemented are described in more detail in Ser. No. 062,944.

In this embodiment, system controller 11 is again an IBM-AT, an IBM PS/2 Model 30, 60, or 80, or other computer programmed and equipped to emulate an operator terminal which is designed to interface with mainframe computer 16 via the serial port. For example, if the serial port of mainframe 16 and data terminals 12a4–12j4 are RS-232C ports, SP2–SP11 and SP16 of system controller 11 would preferably also be RS-232C ports. Furthermore, system controller 11 is programmed to use exactly the same commands and data formats that are required by the applications package resident in computer 16. This allows system controller 11 to substantially enhance the incoming and outgoing call processing capability of mainframe 16 and operator terminals 12a–12j by providing automated dialing, call progress monitoring, automatic answering, and routing of incoming and outgoing calls, etc., without requiring that the applications program or other software for mainframe computer 16 or operator terminals 12a–12j be replaced, changed, or modified in any way.

In an alternative embodiment of FIG. 2, no attempt is made to continue using the applications software previously existing in mainframe 16. That is, one or more new applications programs may be installed in mainframe 16, and system controller 11 uses the command and data format structure required by the new applications programs. Since system controller 11 acts as an interpreter between host 16 and the operator terminals 12, the operator terminals 12 may, but need not, use the same command and data format structure as that used by the new applications programs. Therefore, the present invention is not limited to systems which continue to use existing applications programs.

Figure 3:
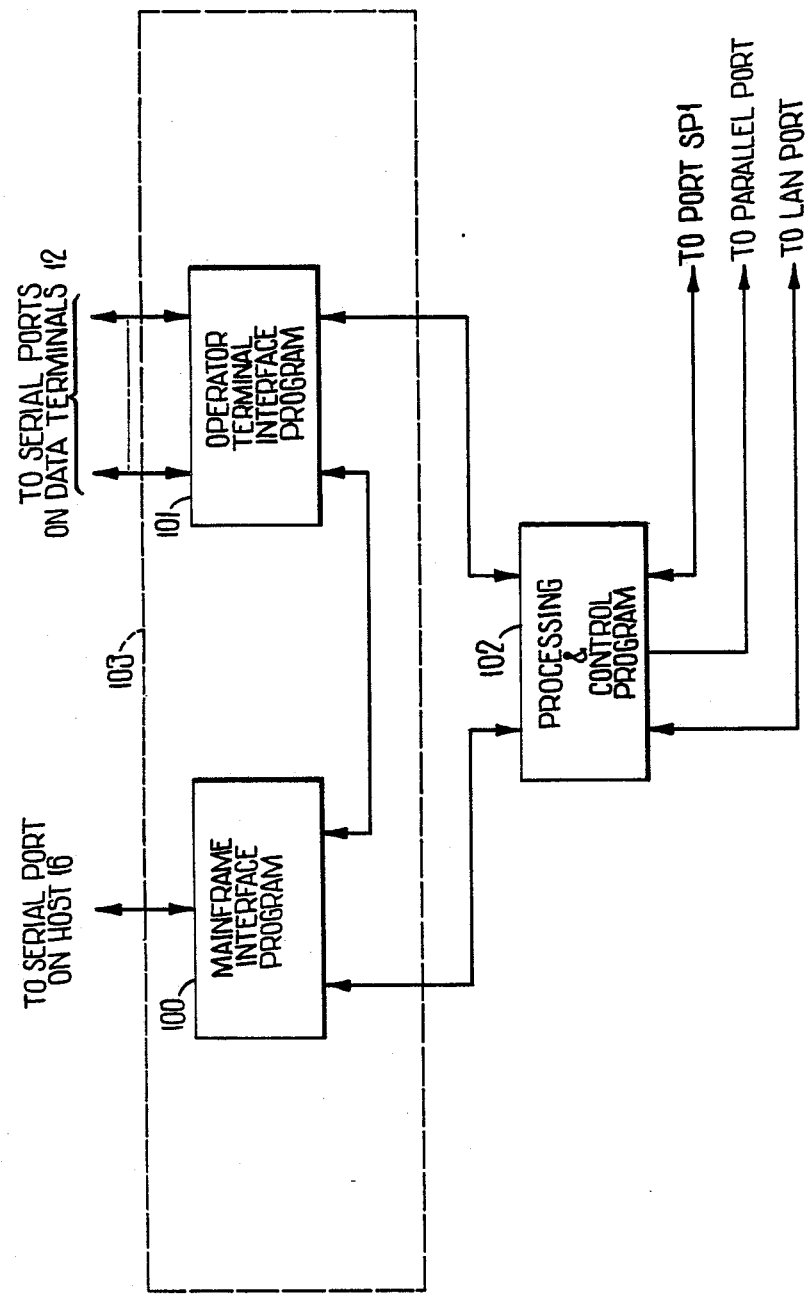
FIG. 3 is an illustration of the programming packages contained in the system controller.

Turn now to FIG. 3 which is an illustration of the programming packages contained in system controller 11. A mainframe interface program 100 controls communications over the serial port which is connected to the serial port of mainframe computer 16. In the preferred embodiment, a high speed serial port of mainframe 16 is used. Operator terminal interface program 101 controls the data transfer on the serial ports which are connected to the serial ports (B) of operator terminals 12a–12j. Processing and control program 102 controls the operation of serial port SP1, which is connected to the trunk interface units 10 of FIGS. 1 and 2, the parallel port which is connected to switch 13 of FIGS. 1 and 2, and the local area network port LAN of FIGS. 1 and 2. Program 102 extracts the customer account number, the customer's name, the customer's telephone number, etc., form the customer account record received from mainframe computer 16.

Mainframe interface program 100 converts between the commands or instructions and data formats required by mainframe computer 16 and the commands or instructions and data formats used by program 102. Likewise, operator terminal interface program 101 converts between the commands and data formats required by the operator terminals 12a–12j and the commands or instructions and data formats used by processing and control program 102. This allows a standard processing and control program 102 to be written which performs the desired functions of system controller 11. Then, programs 100 and 101 provide the necessary interface between program 102 and the mainframe 16 and operator terminals 12. Therefore, rather than having to rewrite program 102 for each different type of system, it is only necessary to write interface programs 100 and 101. Furthermore, mainframe computer 16 and operator terminals 12 may continue to use the applications software and other programming with which they were originally equipped. This allows the user to either continue using existing data terminals or acquire new data terminals, as desired. Therefore, it is possible to significantly extend or upgrade an existing system by the addition of system controller 11 and trunk interface units 10 but without the necessity of obtaining new applications programs and software for mainframe computer 16.

Figure 4A:
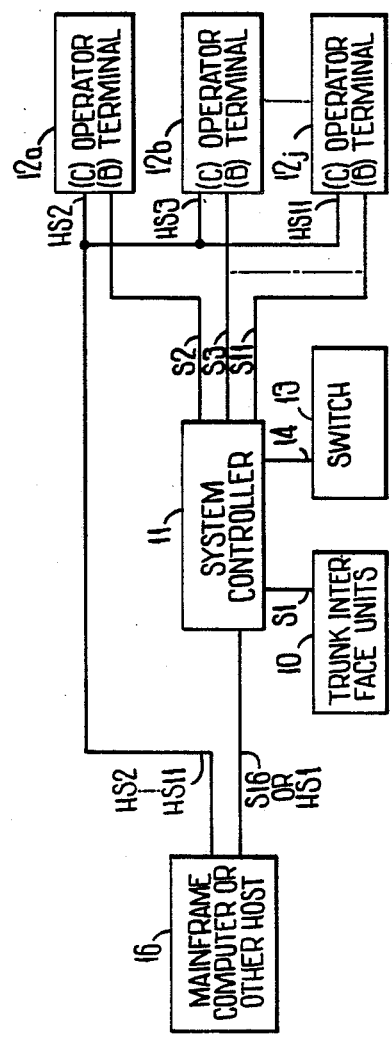
FIG. 4A is one example of a typical environment in which the present invention might be used.

Turn now to FIG. 4A which is one example of a typical environment in which the present invention might be used. Mainframe computer 16 is connected by conductor HS1 or S16 to system controller 11 and by cables HS2–HS11 to operator terminals 12a–12j. System controller 11 is connected by conductors S2–S11 to operator terminals 12a–12j. System controller 11 is connected by conductor S1 to trunk interface units 10 and by parallel bus 14 to switch 13. It will be appreciated that FIG. 4A is a simplified diagram of the environment of FIG. 1. That is, upon receipt of the abbreviated account data from system controller 11 or upon entry of particular data, such as a name, account number, or telephone number, each data terminal 12 will directly request the full account data from host 16. The request may be initiated as a result of receiving the abbreviated account data or in response to one or more key entries by an operator. In any event, the data will pass between host 16 and the data terminal without requiring the intervention of system controller 11 or requiring any data to pass through system controller 11.

If cables HS2–HS11 are eliminated, then the diagram of FIG. 4A becomes a simplified diagram of the environment of FIG. 2. That is, data transfers between mainframe computer 16 and operator terminals 12 must pass through system controller 11. System controller 11 therefore maintains interface capability with mainframe computer 16 and operator terminals 12 while enhancing the capabilities of the overall system by controlling the operation of trunk interface units 10 and switch 13. The data terminals may, upon receipt of the abbreviated account data from system controller 11 or upon entry of particular data, such as a name, account number, or telephone number, request the full account data from host 16 but, in this alternative environment, all requests from data terminal must pass through system controller 11 and all data transfers between host 16 and a data terminal must pass through system controller 11.

Figure 4B:
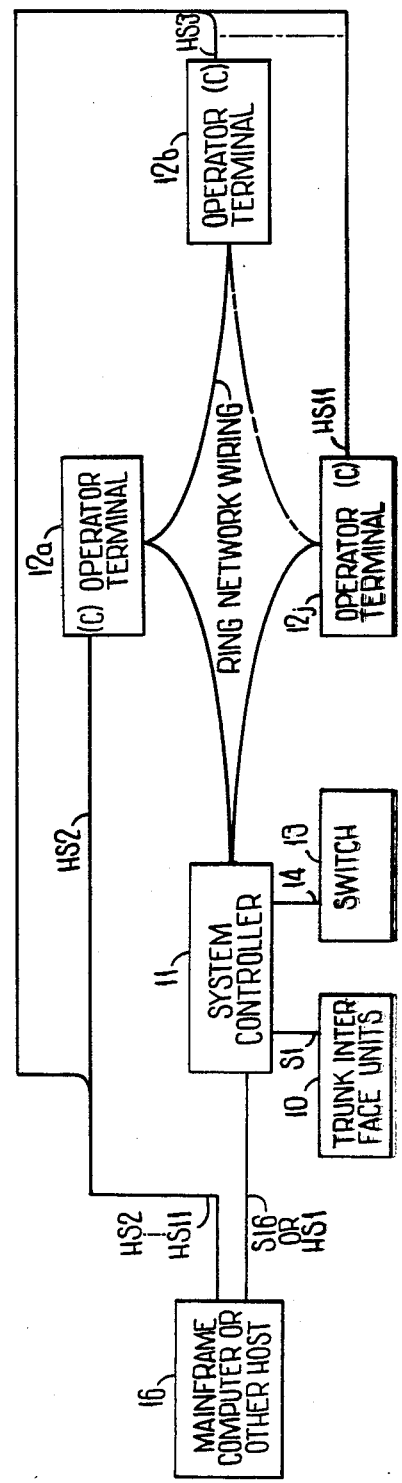
FIG. 4B is a block diagram of another typical environment in which the present invention might be used.

FIG. 4B is a block diagram of another typical environment in which the embodiment of FIG. 2 might be used. Mainframe computer 16 is connected to system controller 11. System controller 11 is connected to trunk interface units 10 and switch 13. The operator terminals 12 are two-port devices connected to host 16 via cables HS2–HS11. This allows data transfers to bypass system controller 11 so that system controller 11 need not function as a data conduit between host 16 and the terminals 12. The terminals 12 are capable of directly communicating with host 16 using the commands and data format required by the original applications program used by host 16. System controller 11 and operator terminals 12a–12j are connected in a ring network. Note that system controller 11 maintains compatibility with mainframe 16 on one side and maintains compatibility with a ring network comprising operator terminals 12a–12j on the other side. Therefore, in addition to upgrading the system to provide the functions (automated dialing, automated answering, etc.) discussed previously and in application Ser. No. 062,944, system controller 11 also provides an interface between mainframe 16 and the ring network with which mainframe 16 may or may not have been previously compatible. In the preferred embodiment of this environment, system controller 11 and each terminal 12 can communicate directly with the host 16. Therefore, as in FIG. 1, system controller 11 is responsible for the initiation, answering, and handling of telephone calls. System controller 11 also provides abbreviated customer account data to the terminals 12. The terminals 12, in an automatic response to receipt of the abbreviated data from system controller 11, or as a result of one or more key entries by the operator, request host 16 to provide the full data to the terminal 12. Therefore, in this configuration, it is necessary that the terminals 12 be compatible with host 16.

In an alternative embodiment, terminals 12 are one-port devices so cables HS2–HS11 are not used. Therefore, all data must pass through system controller 11. However, since the data terminals 12 communicate with host 16 through system controller 11 it is not necessary for the terminals to be compatible with the host 16. System controller 11, in this case, acts as an interpreter between the command and data format structure required by host 16 and the command and data format structure used by the terminals. Therefore, another benefit of the present invention is that normally incompatible operator terminals 12 may be used with an existing computer 16 and its present programs by the addition of system controller 11. This benefit arises because the mainframe interface program 100 of FIG. 3 may be different from or identical to the operator terminal interface program 101.

Figure 4C:
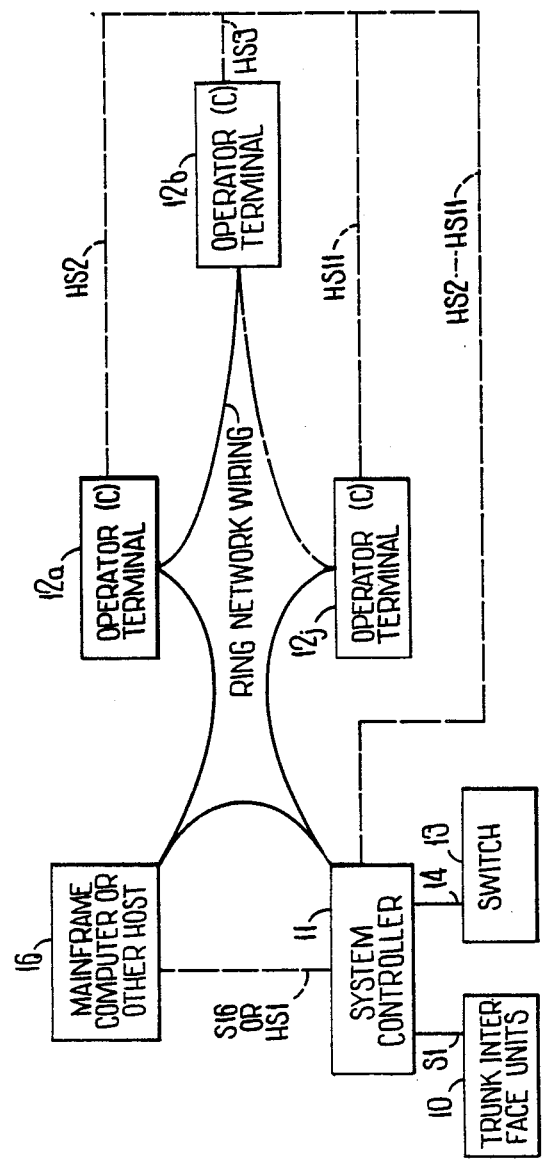
FIG. 4C is a block diagram of another environment in which the present invention might be used.

FIG. 4C is a block diagram of another environment in which the present invention might be used. In the preferred embodiment of this case, mainframe computer 16, operator terminals 12, and system controller 11 are all connected to ring network. System controller 11 is also connected to the trunk interface units 10 and switch 13. In this case, the operator terminal interface program 101 of FIG. 2 might be eliminated and the mainframe interface program 100 of FIG. 2 would be a ring network interface program. A system controller 11 or a plurality of system controllers can therefore be inserted into an existing ring network without requiring that the software used to drive the ring network be replaced or modified in any way.

If new operator terminals 12, with a high speed port (C) are used, then the data terminals would preferably be programmed to emulate the previously existing data terminals, and system controller 11 would be connected to the data terminals via cables HS2–HS11 and to host 16 via cable S16 or HS1. Cables HS2–HS11 are shown as dashed lines in FIG. 4C.

Figure 5A:
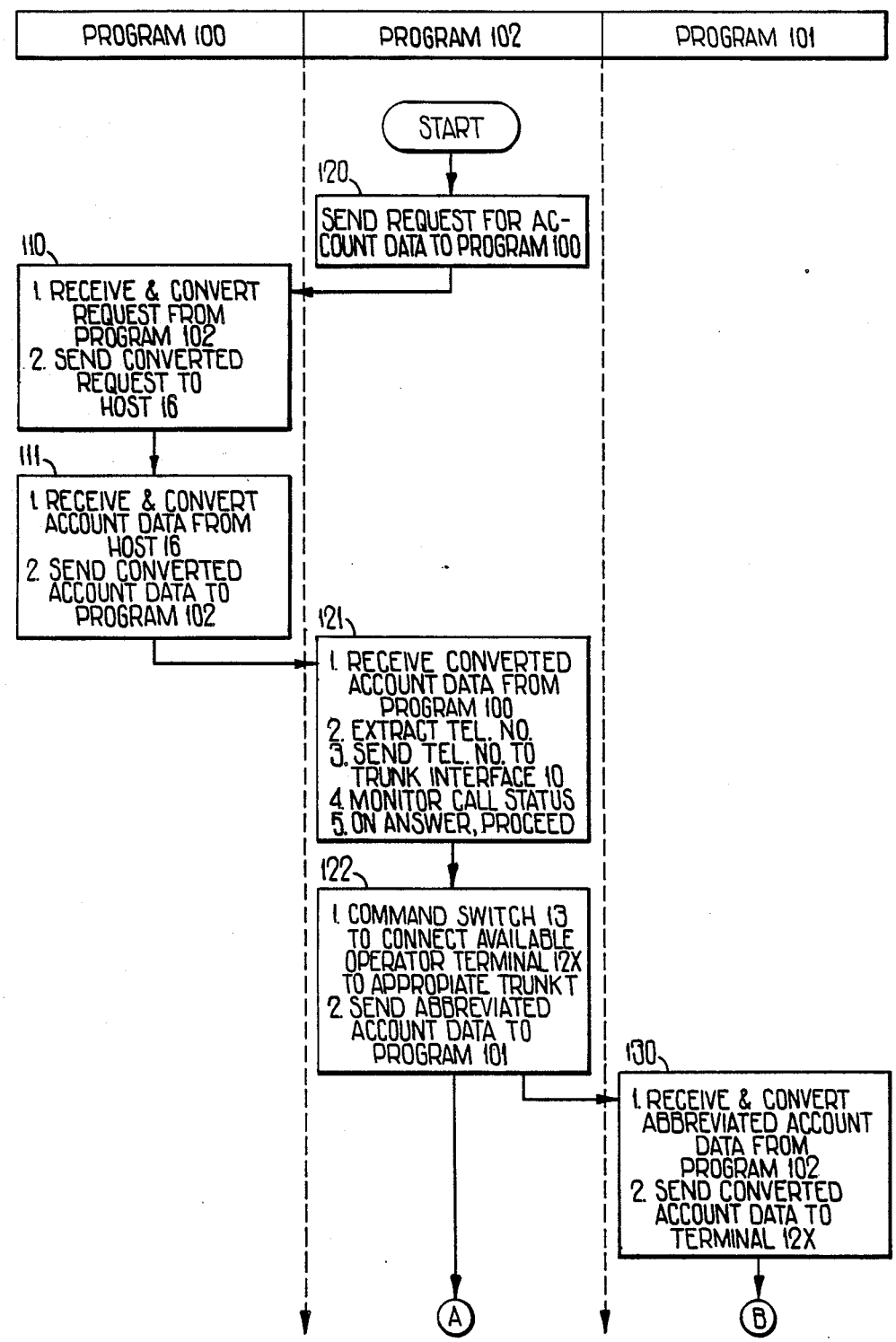
Figure 5B:
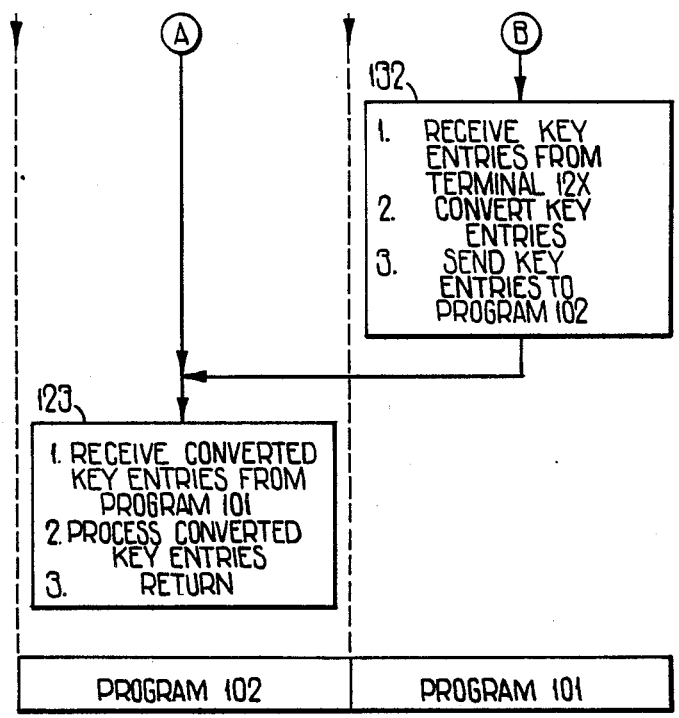

Turn now to FIGS. 5A and 5B1 which are a flow chart of the operating programs of the system controller 11 where, as in FIG. 1, system controller 11 is not required to transfer data between host 16 and terminals 12. Program 102 first requests 120 the data on another account from program 100. Program 100 then receives and converts 110 the request from program 102 from the command and data format structure used by system controller 11 into the command and data format structure required by the host 16. Program 100 then sends the converted request to the host 16. Program 100 then receives and converts 111 the account data or calling list, received from host 16, from the data format used by host 16 into the data format used by system controller 11. Program 100 then sends 111 the converted account data or calling list to program 102. In step 121 program 102 receives the converted account data or calling list from program 100, extracts the customer telephone number from the account data or calling list, sends the telephone number to the trunk interface 10 for the placement of an outgoing call, monitors the call status, and if the call is answered proceeds to step 122.

In step 122 program 102 commands switch 13 to connect available operator terminal 12x to the appropriate telephone trunk T, and sends abbreviated account data to program 101. In step 130 program 101 receives and converts the abbreviated account data from program 102 from the data format used by system controller 11 to the data format used by the operator terminals 12, and then sends the converted account data to operator terminal 12x.

In step 132, program 101 receives key entries made by the operator at terminal 12x, converts the key entries from the data format and structure used by the operator terminals 12 into the data format and structure used by system controller 11, and sends these key entries to program 102. In step 123, program 102 receives the converted key entries from program 101 and then processes the converted key entries.

The software of some host computers may include an instruction for the host computer to send only abbreviated customer account data, such as a name, account number, and telephone number, and another instruction to send the full customer account file. Other systems may simply have one instruction which causes the host computer 16 to send the full customer account file. The present invention works with either type of system and, if an instruction to send abbreviated data is part of the host 16 software then, at step 120, system controller 11 may simply request the abbreviated data rather than the full account data.

When system controller 11 sends the abbreviated data to a terminal 12, the terminal 12 requests host 16 to send the full account data. This request may be made in response to receipt of the abbreviated data or may be made in response to an operator key entry or entries at the data terminal 12.

System controller 11 and terminals 12 emulate the characteristics of existing operator terminals so that mainframe computer 16 uses the same software with which it was originally equipped. Therefore, the operation of system controller 11 and the operator terminals 12 is transparent to the host 16. This allows the entire system to be extended or upgraded to an automated call handling system by the addition of system controller 11 but without requiring new software or applications programs for the host 16. Although the flow chart of FIGS. 5A and 5B1 are directed towards the handling of an outgoing call, it will be appreciated that the same technique, converting the commands and data between the different formats and structures, is equally applicable to the handling of processing of incoming calls. U.S. patent application Ser. No. 062,944 describes in detail the preferred handling of an incoming call.

Since the operation of system controller 11 is essentially transparent and does not require new or different software or programming for the host 16 and the operator terminals 12 emulate the previously used terminals, the present invention provides another benefit in upgrading an existing system to provide for automated call handling: it is not necessary to retrain the operators of the operator terminals 12. Since the software is unchanged, the operation of the terminals is unchanged and the operators may continue to operate existing terminals in the manner that they have done before. If new terminals are acquired, the operators may continue to use the same commands and see the same screen displays as before. With either embodiment it is no longer necessary for the operator to initiate outgoing calls or answer incoming calls.

In the environment of FIG. 2, system controller 11 transfers the data between host 16 and terminals 12. FIGS. 5A and 5B2 are a flow chart of the operating programs of the system controller 11 where, as in FIG. 2, system controller 11 transfers data between host 16 and terminals 12. FIG. 5B2 differs from FIG. 5B1 in that steps 112, 113, 114 and 131, substep 122a has been added, and step 132 has been modified.

In step 122a, program 102 sends a request for full account data for terminal 12x to program 100. In step 112, program 100 receives and converts the request for the full account data from the command and data format structure used by system controller 11 to the command and data format structure required by host 16, and sends the converted request to host 16. In step 113, program 100 receives the account data from host 16 and then sends the the account data to program 101. In step 131, program 101 receives the account data from program 100 and then sends the account data to terminal 12x. It will be noted that, since host 16 and terminal 12x require, in this embodiment, the same command and data format structure, the account data was sent, without conversion, from step 113 of program 100 to step 131 of program 101. If host 16 and data terminal 12x require different command and data format structures then the conversion can be performed by program 100, program 101, or even program 102.

In substep 132(2), program 101 sends the key entries to program 100. In step 114, program 100 receives the key entries from program 101 and sends these key entries to host 16. It will again be noted that, since host 16 and terminal 12x require, in this embodiment, the same command and data format structure, the key entries were sent, without conversion, from substep 132(2) of program 101 to step 114 of program 100. If host 16 and data terminal 12x require different command and data format structures then the conversion can be performed by program 100, program 101, or even program 102.

It will therefore be appreciated that the present invention allows for the continued use of existing terminals, the use of new terminals which emulate the existing terminals, and the use of new terminals which are incompatible with host 16, all without requiring any changes to the host 16 or the applications program previously installed in host 16.

It will be appreciated from an inspection of FIGS. 4A–4C that system controller 11 has access to all communications between mainframe 16 and operator terminals 12. In the preferred embodiment system controller 11 monitors all communications between mainframe 16 and operator terminals 12 so that system controller 11 will know whether a particular operator terminal 12x is busy or available. Alternatively, system controller 11 may periodically poll the operator terminals 12 to determine whether a particular operator terminal 12x is available or is busy. Alternatively, if mainframe 16 periodically polls the operator terminals 12 then system controller 11 may simply monitor the polling activity of mainframe 16 and the response of the operator terminals 12. In networks where source and/or destination addresses are used as part of the command and data format or structure then, in order to monitor the activity of mainframe 16 and operator terminals 12 system controller 11 evaluates and acts upon all communications regardless of whether the destination address in the communication indicates that the communication is intended for system controller 11.

In the preferred embodiment, system controller 11 will send abbreviated account data to a data terminal 12x so that data terminal 12x will display an abbreviated screen. Data terminal 12x then requests the full account data from host 16. In the preferred embodiment, the data terminals 12 are smart terminals and, upon receipt of the abbreviated account data from system controller 11, automatically requests the full account data from host 16.

In an alternative embodiment, when system controller 11 sends the abbreviated account data to data terminal 12x, system controller 11 will request host 16 to transfer the full account data to the data terminal 12x.

Also, when sending a command and/or data, system controller 11 may provide a source or destination address different from that of its own. For example, assume that in FIG. 4C system controller 11 has determined that operator terminal 12b is available to handle the present telephone call. System controller 11 would then send to mainframe 16 a request for full account data. However, rather than inserting its own device address into the message to mainframe 16, system controller 11 would insert the address of operator terminal 12b into the message. Mainframe 16 would then send the account data to the device having the address specified in the request. In this case, the destination address would be that of operator terminal 12b so operator terminal 12b would receive the message from mainframe 16, inspect the device address, determine that it was the same as its own device address, accept the data, and display the data on its screen 12b5.

In an alternative embodiment, system controller 11, using its own device address, requests the data from mainframe 16, receives the data from mainframe 16, and then retransmits the data with a device address corresponding to that of operator terminal 12b. Therefore, system controller 11, even while controlling the origination and/or transfer of command and/or data between host 16 and operator terminals 12, remains essentially transparent to mainframe 16 and operator terminals 12 so that reprogramming of mainframe 16 and operator terminals 12 is not required.

In another alternative embodiment, system controller 11, using its own device address, request one or more calling lists from mainframe 16, receives the data from mainframe 16, and instructs a trunk interface unit 10 to dial the next number in the calling list. Upon detection by a trunk interface unit 10 of an answer by the called party, system controller 11 will cause cross-point switch 13 to connect the appropriate trunk line T to the audio communications device 12a3 of an available operator. System controller 11 may then send the data from the calling list to the data terminal 12a4 and request host 16 to provide full data to the data terminal, may simply request host 16 to provide the full data to the data terminal, or may send the calling list data to the data terminal whereupon the data terminal requests the full account information from host 16.

Turn now to FIG. 6 which is a block diagram of a typical trunk interface unit 10a constructed to handle both incoming and outgoing calls. The trunk interface unit 10a preferably contains a dialer 10a1, a call progress monitor 10a5, a message player/recorder 10a9, an incoming call detector 10a20, an automatic number identification (ANI) decoder 10a24, a dual tone multiple frequency (DTMF) decoder 10a28, and a voice recognition module 10a32 for each trunk T1-T4. Dialer 10a1, call progress monitor 10a5, message player/recorder 10a9, incoming call detector 10a20, ANI decoder 10a24, DTMF decoder 10a28, and voice recognition module 10a32 are all connected to trunk T1. Likewise, dialer 10a1, call progress monitor 10a5, message player/recorder 10a9, incoming call detector 10a20, ANI decoder 10a24, DTMF decoder 10a28, and voice recognition module 10a32 are all connected by bus 10a14 to the T1I port of trunk interface control unit 10a13. The function of dialer 10a1, call progress monitor 10a5, and message player 10a9 have been previously described.

Incoming call detector 10a20 monitors trunk T1 and advises trunk interface control unit 10a13 when an incoming ringing signal appears on trunk T1. In the preferred embodiment, trunk interface control unit 10a13 will report an incoming call on trunk T1 to system controller 11 in the static status byte for trunk T1. Upon detecting an incoming call on trunk T1 trunk interface control unit 10a13 may direct ANI decoder 10a24 to obtain the telephone of the calling party, and direct message player/recorder 10a9 to seize the line and begin playing the prerecorded message or, alternatively, system controller 11 may instruct trunk interface control unit 10a13 to direct ANI decoder 10a24 and message player/recorder 10a9 to perform these functions. The message played by message player/recorder 10a9 may be a simple message advising the party that an operator will be connected as soon as one becomes available or, in conjunction with DTMF decoder 10a28, may query the customer for more information such as the customer's telephone number and/or account number.

Furthermore, in some areas of the country, the local telephone office provides a service, sometimes called automatic number identification (ANI). In areas where ANI is available, the central office will provide, over the trunk, tone signals, ISDN data signals, or other signals which can be decoded to yield the number from which the calling party is calling. In this case, a decoder, such as ANI decoder 10a24 would provide the calling party's telephone number to trunk interface control unit 10a13. Trunk interface control unit 10a13 would then provide the calling party telephone number to system controller 11. System controller 11 requests mainframe 16 to provide the customer account information based upon the calling party telephone number. If the calling party telephone number does not correspond to the telephone number for an existing client then, when an operator becomes available, system controller 11 will connect the calling party to the available operator and also provide the calling party telephone number to the operator terminal for manual input. The operator can then conduct business with the calling party, obtain other information from the calling party, such as a name and/or an account number, enter this information via the keyboard to obtain the customer account information from mainframe 16, establish an account for a new customer etc.

However, if the calling party telephone number corresponds to the telephone number of an existing client in the database, then mainframe computer 16 will provide this information either to system controller 11 or to the next available operator terminal. When an operator becomes available, system controller 11 will provide the abbreviated customer account information to the available operator terminal. The operator terminal will then, as previously described, obtain the full customer account information from mainframe 16. The operator can then conduct the necessary business with the customer.

DTMF decoder 10a28 allows the customer to provide certain information via the DTMF keypad on his telephone set. For example, assume that ANI service is not available in the area. Upon being advised of an incoming call, trunk interface control unit 10a13 or system controller 11 will cause message player 10a9 to seize the line and begin playing the first prerecorded message. The first prerecorded message may be, for example, a message asking the calling party to key in the DTMF digit 1 if the calling party has an established account and the digit 2 if the calling party does not have an established account. Other prerecorded messages on message player 10a9 may query the customer and ask for an appropriate DTMF keypad response as to whether the customer wishes to open a new account, change an existing account, place, change or cancel an order, etc. Therefore, message player 10a9 may contain more than one message, the particular message to be played determined by the numbers which the calling keyed in over his DTMF keypad. Also, a message on message player 10a9 may ask the calling party to key in his telephone number and/or account number. This information would then be provided via trunk interface control unit 10a13 to system controller 11. When an operator becomes available, system controller 11 sends the information collected to the operator terminal for display upon the screen. Then, either automatically or in response to an operator keystroke, the operator terminal sends the collected information to mainframe 16. Mainframe 16 then provides the full customer account information to the operator terminal.

Therefore, for incoming calls, the operator has been relieved of the time consuming and inefficient duties of answering the call, ascertaining the customer's account number, and keying in the customer's account number. For established clients, the operator has the customer account information on screen immediately upon being connected to the calling party. Furthermore, where the orders are placed, changed or cancelled by the calling party's use of the DTMF keypad it may not be necessary for the operator to intervene at all or, in the alternative, the operator may simply be connected in order to verbally verify the information provided by the calling party.

System controller 11 is capable of automatic call distribution (ACD) routing of calls. Also, if different operators handle different types of calls, such as incoming calls, outgoing calls, establish new account; place or change an order, contact regarding a delinquent account, etc., system controller 11 automatically routes the incoming or outgoing call to the next available operator which handles that particular type of call. Therefore, the order and/or selection of which operator is connected to a particular call is controlled by system controller 11 on an ACD basis.

Voice recognition module 10a32 allows some transactions to be completely handled without operator intervention and without requiring the customers to have a DTMF-type telephone. In the preferred embodiment, module 10a32 is the TeleRec system, manufactured by Voice Control Systems, Dallas, Tex. Details of operation of the TeleRec system are available from the manufacturer upon request. Module 10a32 provides digital output signals corresponding to a predetermined vocabulary, such as the spoken words one through nine, zero (oh), yes, no, help, cancel, and terminate. The TeleRec system also decodes DTMF tones and eliminates the need for a separate DTMF decoder 10a28.

When module 10a32 is used, instead of immediately routing an incoming call or an answered outgoing call to an operator at an operator terminal 12a, the initial contact is handled by system controller 11.

When an incoming call or an outgoing call is answered trunk interface control unit 10a13 will cause message player/recorder 10a9 to begin playing the first prerecorded message. This prerecorded message contains instructions for the customer to speak the appropriate word, or words, at the end of the message, to indicate the customer's response to the message. The response elicited may be, for example, an account number, a telephone number, a "yes" or a "no", etc. Module 10a32 decodes the customer's response and provides this response to system controller 11. Based upon the customer's response, system controller 11 may cause message player/recorder 10a9 to play an appropriate next message, disconnect trunk T1, or connect an available operator and provide the customer's responses to the operator's terminal for display on the screen.

The particular messages played, and the customer's response, such as placing an order, changing an order, etc., are then stored by system controller 11 and/or mainframe 16. The customer's responses are also used to immediately update the customer account information in mainframe 16. Therefore, certain types of transactions can be handled without the intervention of an operator, thereby reducing the number of operators required and/or more efficiently utilizing the operators. Also, since both DTMF tones and spoken words can be recognized and acted upon, the use of module 10a32 allows transactions to be automatically conducted both with customers who have DTMF telephones and with customers who have rotary dial (pulse) telephones.

It will be appreciated that control of the call and monitoring of the customer's response need not be done solely by system controller 11 but may also be performed, wholly or partly, by an operator at a data terminal 12.

It will also be appreciated that, in a typical environment, the message played to customer will be substantially longer than the customer's response (yes, no, cancel, etc.) to the message. Therefore, a voice recognition module, such as 10a32, could be switched, or multiplexed, between several trunks, instead of being dedicated to a single trunk.

Although not shown, it will be understood that a similar array of devices is also connected to trunks T2-T4, and that trunk interface control unit 10a13 controls this array of similar devices via its T2I-T4I ports over buses 10a15-10a17, respectively.

It will be appreciated that the devices connected to a trunk used only for outgoing calls need not have an incoming call detector, an ANI decoder, or a DTMF decoder. Likewise, for a trunk which handles only incoming calls, dialer 10a1 and call progress monitor 10a5 are not required. Furthermore, in areas where ANI is not available then there will be no need for an ANI decoder.

U.S. patent application Ser. No. 062,944 discloses that a controller, such as system controller 11, can be used to maintain a record of the parameters (time of day, duration, busy, no answer, etc.) for each call. This technique may be used for the present invention. However, in the preferred embodiment of the present invention, one or more of the operator terminals 12 is configured to run without operator intervention or assistance. In this embodiment, system controller 11 will send an indication of the call status (busy, no answer, etc.) and some record identification key to the unattended operator terminal 12. This operator terminal 12 will send the record identification key to the host 16, obtain the customer account record from the host 16, and cause the host 16 to update the record to reflect the call status.

Although reference has been made to use of account numbers and telephone numbers, it will be appreciated that other record identification keys, such as name, address, invoice number, etc., may also be used to identify and access a record.

In summary, the present invention provides a method and apparatus for retrofitting and upgrading an existing customer account servicing system to provide for automated handling and processing of both incoming and outgoing calls. This is accomplished without requiring new operating software or applications packages for the mainframe computer or the operator terminals. The retrofit is transparent to the operation of the mainframe and the operator terminals and significantly enhances the operation and capabilities of the existing system. Since other embodiments of the present invention may suggest to themselves to those skilled in the art based upon a reading of the foregoing disclosure, the present invention is to be limited only by the claims below.

We claim:

1. For use with a customer account servicing system having a host, said host containing a plurality of customer account records and having an applications program which uses a predetermined instruction set and a predetermined data format, an apparatus for upgrading said customer account servicing system to provide for automatic call placement and handling while still using said applications program, said predetermined instruction set, and said predetermined data format, comprising:

a plurality of operator terminals, each operator terminal of said plurality of operator terminals comprising a data terminal and an associated audio communications means, each said data terminal communicating with said host using said predetermined instruction set and said predetermined data format;

trunk switching means responsive to switching control signals for connecting selected trunks of a plurality of telephone trunks to selected ones of a plurality of said audio communications means;

trunk interface means responsive to interface control signals for performing selected functions on said telephone trunks and providing a status for said telephone trunks; and control means having at least one terminal interface port for communicating with a plurality of said data terminal, having a host interface port for communicating with said host using said predetermined instruction set and said predetermined data format, having a switching control port for providing said switching control signals to said trunk switching means, having a trunk interface control port for providing said interface control signals to said trunk interface means and receiving said status for said telephone trunks from said trunk interface means, said control means obtaining a predetermined number of said customer account records from said host using said predetermined instruction set and said predetermined data format and, for at least one record, extracting a customer telephone number, causing said trunk interface means to place an outgoing call by dialing said customer telephone number on a selected trunk of said telephone trunks, responding to said trunk interface means providing an indication that said outgoing call has been answered by causing said trunk switching means to connect said selected trunk for said outgoing call which has been answered to a said audio communications means of an available operator, and causing said host to send at least a portion of said record to said data terminal of said available operator.

2. The apparatus of claim 1 wherein said control means causes said host to send said portion of said record to said data terminal of said available operator by sending a record identification key for said record to said data terminal and said data terminal requests said record from said host.

3. The apparatus of claim 1 wherein said control means causes said host to send said portion of said record to said data terminal of said availble operator by sending to said host a command identical to that which said data terminal would send to said host to obtain said record.

4. The apparatus of claim 1 wherein said trunk interface means comprises:

first means responsive to said interface control signals for seizing said selected trunk of said plurality of telephone trunks;

second means responsive to said interface control signals for placing said outgoing call by placing dialing signals on said selected trunk; and call progress monitoring means for monitoring said selected trunk and providing said indication that said outgoing call has been answered.

5. The apparatus of claim 1 and further comprising:

message player means for placing a first predetermined message on said selected trunk for prompting a called party to provide a response;

decoder means responsive to signals placed upon said selected trunk by said called party for providing a decoded response;

wherein said control means is responsive to said trunk interface means indicating that said outgoing call has been answered for causing said message player means to place said first predetermined message on said selected trunk, and responsive to said decoded response for determining whether assistance from an operator is required;

wherein, if said assistance is required, said control means causes said trunk switching means to connect said selected trunk to said audio communications means of said available operator and provides at least a predetermined portion of said customer account record to said data terminal of said available operator, and said data terminal provides data entries made at said data terminal by said operator to said host using said predetermined instruction set and said predetermined data format, and said host updates said record by incorporating said data entries into said record; and if said assistance is not required, said control means provides said decoded response as data entries to said host using said predetermined instruction set and said predetermined data format, said host updates said customer account record by incorporating said data entries into said record, and said control means causes said message player means to place a next predetermined message on said selected trunk.

6. The apparatus of claim 5 wherein said next predetermined message prompts said called party to provide another response.

7. The apparatus of claim 5 wherein at least one said message prompts said called party to provide said response using a telephone keypad, and said decoder means comprises a tone decoder.

8. The apparatus of claim 5 wherein at least one said message prompts said called party to provide said response using voice words, and said decoder means comprises a voice decoder.

9. The apparatus of claim 8 wherein at least one said message prompts said called party to provide a response using a predetermined group of voice words.

10. For use with a customer account servicing system having a host, said host containing a plurality of customer account records, said host having an applications program which uses a predetermined instruction set and a predetermined data format, an apparatus for upgrading said customer account servicing system to provide for automated incoming call handling while still using said applications program, said predetermined instruction set, and said predetermined data format, comprising:

a plurality of operator terminals, each operator terminal of said plurality of operator terminals comprising a data terminal and an associated audio communications means, each said data terminal communicating with said host using said predetermined instruction set and said predetermined data format;

trunk switching means responsive to switching control signals for connecting selected trunks of a plurality of telephone trunks to selected ones of said audio communications means;

incoming call detection means for providing a ring detect signal when an incoming call occurs on a telephone trunk of said plurality of telephone trunks;

automatic number identification (ANI) decoder means responsive to predetermined signals on said telephone trunk which has said incoming call for providing a calling party telephone number; and control means having at least one terminal interface port for communicating with a plurality of said data terminal, having a host interface port for communicating with said host using said predetermined instruction set and said predetermined data format, and having a switching control port for providing said switching control signals to said trunk switching means, said control means responding to said ring detect signal by causing said trunk switching means to connect said telephone trunk which has said incoming call to said audio communications means for an available operator and responding to said calling party telephone number by causing said host to provide to said data terminal for said available operator at least a portion of a customer account record which has a customer telephone number corresponding to said calling party telephone number.

11. The apparatus of claim 10 wherein said control means monitors each of said operator terminals to determine whether each said operator terminal is available or not available and, when said incoming call occurs, said control means receives said calling party telephone number from said ANI decoder means for said telephone trunk which has said incoming call, provides said calling party telephone number to a said data terminal of an available said operator terminal and, using said predetermined instruction set and said predetermined data format, causes said host to provide to said data terminal at least a portion of a said customer account record which has said customer telephone number corresponding to said calling party telephone number, and causes said trunk switching means to connect said telephone trunk to said audio communications means of said available said operator terminal.

12. The apparatus of claim 11 and further comprising:
message player means for placing a message on a selected one of said telephone trunks;
wherein, when an incoming call occurs on one of said telephone trunks and a said operator terminal is not available, said control means causes said message player means to place said message on said one of said telephone trunks having said incoming call.

13. The apparatus of claim 12 wherein said message player means comprises:
a plurality of message playing devices, each of said devices being for placing a said message on a predetermined one of said telephone trunks.

14. The apparatus of claim 10 and further comprising:
message player means for placing a first predetermined message on said telephone trunk which has said incoming call for prompting a calling party to provide a response; and
decoder means responsive to signals placed on said telephone trunk by said calling party for providing a decoded response;
wherein said control means is further responsive to said decoded response for determining whether assistance from an operator is required;
wherein, if said assistance is required, said control means causes said trunk switching means to connect said telephone trunk to said audio communications device of said available operator, said data terminal of said available operator provides data entries made at said data terminal by said operator to said host, and said host updates said customer account record by incorporating said data entries into said customer account record; and
if said assistance is not required, said control means provides said decoded response as data entries to said host, said host updates said customer account record by incorporating said data entries into said customer account record, and said control means causes said message player means to place a next predetermined message on said telephone trunk.

15. The apparatus of claim 14 wherein said next predetermined message prompts said calling party to provide another response.

16. The apparatus of claim 14 wherein at least one said predetermined message prompts said calling party to provide said response using a telephone keypad and said decoder means comprises a tone decoder.

17. The apparatus of claim 14 wherein at least one said predetermined message prompts said calling party to provide said response using voice words and said decoder means comprises a voice decoder.

18. The apparatus of claim 17 wherein at least one said predetermined message prompts said calling party to provide said response using a predetermined group of voice words.

19. The apparatus of claim 10 wherein said control means causes said host to send said portion of said customer account record to said data terminal of said available operator by sending a record identification key for said record to said data terminal and said data terminal requests said record from said host.

20. The apparatus of claim 10 wherein said control means causes said host to send said portion of said customer account record to said data terminal of said available operator by sending to said host a command identical to that which said data terminal would send to said host to obtain said record.

21. For use with a customer account servicing system having a host, said host containing a plurality of customer account records, said host having an applications program which uses a predetermined instruction set and a predetermined data format, an apparatus for upgrading said customer account servicing system to provide for automated incoming call handling while still using said applications program, said predetermined instruction set, and said predetermined data format, comprising:
  a plurality of operator terminals, each operator terminal of said plurality of operator terminals comprising a data terminal and an associated audio communications means, each said data terminal communicating with said host using said predetermined instruction set and said predetermined data format;
  trunk switching means responsive to switching control signals for connecting selected trunks of a plurality of telephone trunks to selected ones of said audio communications means;
  incoming call detection means for providing a ring detect signal when an incoming call occurs on a said telephone trunk;
  message player means for placing a first predetermined message on said telephone trunk which has said incoming call for prompting a calling party to provide a response;
  decoder means responsive to signals placed on said telephone trunk by said calling party for providing a decoded response; and
  control means having at least one terminal interface port for communicating with a plurality of said data terminal, having a host interface port for communicating with said host using said predetermined instruction set and said predetermined data format, having a switching control port for providing said switching control signals to said trunk switching means, said control means responding to said ring detect signal by causing said message player means to place said first predetermined message on said telephone trunk which has said incoming call and responding to said decoded response by determining whether assistance from an operator is required;
  wherein, if said assistance is required, said control means causes said trunk switching means to connect said telephone trunk which has said incoming call to said audio communications means of an available operator, said data terminal provides data entries made at said data terminal by said operator to said host, and said host updates a customer account record for said calling party by incorporating said data entries into said customer account record; and
  if said assistance is not required said control means provides said decoded response as data entries to said host, said host updates said customer account record by incorporating said data entries into said customer account record, and said control means causes said message player means to place a next predetermined message on said telephone trunk.

22. The apparatus of claim 21 wherein:
  said first predetermined message prompts said calling party to provide a calling party telephone number;
  said control means provides said calling party telephone number to said host using said predetermined instruction set and said predetermined data format;
  said host advises said control means, using said predetermined instruction set and said predetermined data format, whether a customer account record having a customer telephone number corresponding to said calling party telephone number is available; and
  if said record is not available, said control means determines that said assistance is required and, further, provides said calling party telephone number to said data terminal.

23. The apparatus of claim 22 wherein, if said record is available, said control means causes said trunk switching means to connect said telephone trunk to said audio communications means of said available operator and causes said host to provide at least a portion of said customer account record to said data terminal of said available operator, said data terminal provides data entries made at said data terminal by said operator to said host, and said host updates said customer account record by incorporating said data entries into said customer account record.

24. The apparatus of claim 21 wherein:
  said first predetermined message prompts said calling party to provide a calling party customer account number;
  said control means provides said calling party customer account number to said host using said predetermined instruction set and said predetermined data format;
  said host, using said predetermined instruction set and said predetermined data format, advises said control means whether a customer account record having a customer account number corresponding to said calling party customer account number is available; and
  if said record is not available, said control means determines that said assistance is required and, further, provides said calling party customer account number to said data terminal.

25. The apparatus of claim 24 wherein, if said record is available, said control means causes said trunk switching means to connect said telephone trunk to said audio communications means of said available operator and causes said host to provide at least a portion of said customer account record to said data terminal of said available operator, said data terminal provides data entries made at said data terminal by said operator to said host, and said host updates said customer account record by incorporating said data entries into said customer account record.

26. The apparatus of claim 21 wherein said next predetermined message prompts said calling party to provide another response.

27. The apparatus of claim 21 wherein at least one said predetermined message prompts said calling party to provide said response using a telephone keypad and said decoder means comprises a tone decoder.

28. The apparatus of claim 21 wherein at least one said predetermined message prompts said calling party to provide said response using voice words and said decoder means comprises a voice decoder.

29. The apparatus of claim 28 wherein at least one said predetermined message prompts said calling party to provide said response using a predetermined group of voice words.

30. The apparatus of claim 21 wherein said control means monitors each of said operator terminals to determine whether a said operator is available and, if said assistance is required and a said operator is not available, causes said message player means to place another predetermined message on said telephone trunk having said incoming call and, when a said operator becomes an available operator, causes said trunk switching means to connect said telephone trunk having said incoming call to said audio communications means of said available operator.

31. The apparatus of claim 30 wherein said message player means comprises:
a plurality of message playing devices, each of said devices being for placing at least one predetermined message on a predetermined one of said telephone trunks.

32. The apparatus of claim 21 wherein said control means evaluates said decoded response to determine whether said assistance is required; and
if said assistance is not required, said control means provides said decoded response as data entries to said host, said host updates said customer account record by incorporating said data entries into said record, and said control means causes said message player means to place a next message on said telephone trunk; and
if said assistance is required, said control means causes said trunk switching means to connect said telephone trunk which has said incoming call to said audio communications means of said available operator and causes said host to provide at least a portion of said customer account record to said data terminal, said data terminal provides data entries made at said data terminal by said operator to said host, and said host updates said customer account record by incorporating said data entries into said customer account record.

33. The apparatus of claim 23 wherein said control means causes said host to send said portion of said customer account record to said data terminal of said available operator by sending a record identification key for said record to said data terminal and said data terminal requests said record from said host.

34. The apparatus of claim 23 wherein said control means causes said host to send said portion of said customer account record to said data terminal of said available operator by sending to said host a command identical to that which said data terminal would send to said host to obtain said portion of said customer account record.

35. The apparatus of claim 25 wherein said control means causes said host to send said portion of said customer account record to said data terminal of said available operator by sending a record identification key for said record to said data terminal and said data terminal requests said record from said host.

36. The apparatus of claim 25 wherein said control means causes said host to send said portion of said customer account record to said data terminal of said available operator by sending to said host a command identical to that which said data terminal would send to said host to obtain said portion of said customer account record.

37. The apparatus of claim 32 wherein said control means causes said host to send said portion of said customer account record to said data terminal of said available operator by sending a record identification key for said record to said data terminal and said data terminal requests said record from said host.

38. The apparatus of claim 32 wherein said control means causes said host to send said portion of said customer account record to said data terminal of said available operator by sending to said host a command identical to that which said data terminal would send to said host to obtain said portion of said customer account record.

39. For use with a customer account servicing system having a host and a plurality of operator terminals, said host containing a plurality of customer account records, each operator terminal of said operator terminals comprising a data terminal and a corresponding audio communications means, said host using a predetermined applications program and communicating with a plurality of said data terminal using a predetermined instruction set and a predetermined data format, an apparatus for upgrading said customer account servicing system to provide for automated call placement and handling while still using said predetermined applications program, said predetermined instruction set and said predetermined data format, comprising:
trunk switching means responsive to switching control signals for connecting selected ones of a plurality of telephone trunks to selected ones of a plurality of said audio communications means;
trunk interface means responsive to interface control signals for performing selected functions on said telephone trunks and providing a status for said telephone trunks; and
control means having a host interface port for communicating with said host using said predetermined instruction set and said predetermined data format, at least one terminal interface port connected to said plurality of said data terminal, a switching control port for providing said switching control signals, and a trunk interface control port for providing said interface control signals, said control means obtaining a predetermined number of said customer account records from said host using said predetermined instruction set and said predetermined data format and, for at least one record, extracting a customer telephone number, causing said trunk interface means to place an outgoing call by dialing said customer telephone number on a selected trunk of said telephone trunks, responding to said trunk interface means providing an indication that said outgoing call has been answered by causing said trunk switching means to connect said selected trunk for said outgoing call which has been answered to a said audio communications means of an available operator, and causing said host to send at least a portion of said record to said data terminal of said available operator.

40. For use with a customer account servicing system having a host and a plurality of operator terminals, said host containing a plurality of customer account records, each operator terminal of said operator terminals comprising a data terminal and a corresponding audio communications means, said host using a predetermined applications program and communicating with a plurality of said data terminal using a predetermined instruction set and a predetermined data format, an apparatus for upgrading said customer account servicing system to provide for automated incoming call handling while still using said predetermined applications program, said predetermined instruction set and said predetermined data format, comprising:

trunk switching means responsive to switching control signals for connecting selected ones of a plurality of telephone trunks to selected ones of said audio communications means;

incoming call detection means for providing a ring detect signal when an incoming call occurs on a said telephone trunk; and automatic number identification (ANI) decoder means responsive to predetermined signals on said telephone trunk which has said incoming call for providing a calling party telephone number;

control means having a host interface port for communicating with said host using said predetermined instruction set and said predetermined data format, at least one terminal interface port connected to said plurality of said data terminal, and a switching control port for providing said switching control signals, said control means responding to said ring detect signal by causing said trunk switching means to connect said telephone trunk which has said incoming call to said audio communications means for an available operator, and responding to said calling party telephone number by using said predetermined instruction set and said predetermined data format to cause said host to provide to said data terminal for said available operator at least a portion of a customer account record which has a customer telephone number corresponding to said calling party telephone number.

41. For use with a customer account servicing system having a host and a plurality of operator terminals, said host containing a plurality of customer account records, each operator terminal of said operator terminals comprising a data terminal and a corresponding audio communications means, said host using a predetermined applications program and communicating with a plurality of said data terminal using a predetermined instruction set and a predetermined data format, an apparatus for upgrading said customer account servicing system to provide for automated incoming call handling while still using said predetermined applications program, said predetermined instruction set and said predetermined data format, comprising:

trunk swithcing means responsive to switching control signals for connecting selected ones of a plurality of telephone trunks to selected ones of said audio communications means;

incoming call detection means for providing a ring detect signal when an incoming call occurs on a said telephone trunk;

message player means for placing a first predetermined message on said telephone trunk which has said incoming call for prompting a calling party to provide a response;

decoder means responsive to signals placed on said telephone trunk by said calling party for providing a decoded response; and control means having a host interface port for communicating with said host using said predetermined instruction set and said predetermined data format, at least one terminal interface port connected to said plurality of said data terminal, a switching control port, and a trunk interface control port for providing said switching control signals, said control means responding to said ring detect signal by causing said message player means to place said first predetermined message on said telephone trunk which has said incoming call and responding to said decoded response by determining whether assistance from an operator is required;

wherein, if said assistance is required, said control means causes said trunk switching means to connect said telephone trunk which has said incoming call to said audio communications means of an available operator, said data terminal provides data entries made at said data terminal by said operator to said host, and said host updates said customer account record of said calling party by incorporating said data entries into said customer account record; and if said assistance is not required, said control means provides said decoded response as data entries to said host using said predetermined instruction set and said predetermined data format, said host updates said host updates said customer account record by incorporating said data entries into said customer account record, and said control means causes said message player means to place a next predetermined message on said telephone trunk.

42. For use with a customer account servicing system having a host and a plurality of operator terminals, said host containing a plurality of customer account records, each operator terminal of said operator terminals comprising a data terminal and a corresponding audio communications means, said host using a predetermined applications program and communicating with a plurality of said data terminal using a predetermined instruction set and a predetermined data format, a method for upgrading said customer account servicing system to provide for automated call placement and handling while still using said predetermined applications program, said predetermined instruction set and said predetermined data format, comprising the steps of:

(a) obtaining at least a first portion of a customer account record from said host using said predetermined instruction set and said predetermined data format;

(b) extracting a customer telephone number from said first portion of said customer account record;

(c) seizing a selected trunk of a plurality of telephone trunks;

(d) placing an outgoing call by causing said customer telephone number to be placed on said selected trunk;
(e) monitoring said selected trunk to determine if said outgoing call has been answered;
(f) if said outgoing call has been answered then:
  (i) placing a message on said selected trunk;
  (ii) monitoring said selected trunk for a response to said message;
  (iii) determining whether said response to said message indicates operator assistance is required;
  (iv) if said operator assistance is required then:
    (A) connecting said selected trunk to an audio communications means of an available operator;
    (B) sending at least a second portion of said customer account record to a data terminal of said available operator;
    (C) providing data entries made at said data terminal to said host; or
  (v) if said operator assistance is not required then providing said response to said host; or
(g) if said outgoing call has not been answered then releasing said selected trunk.

43. The method of claim 42 wherein said message prompts said response by indicating that said response should be voice words.

44. The method of claim 43 wherein said message indicates that said response should be from a predetermined group of voice words.

45. The method of claim 42 wherein said message prompts said response by indicating that said response should be provided using a telephone keypad.

46. The method of claim 42 wherein, at step (f)(iv)(B), said second portion of said customer account record comprises a remainder of said customer account record, said first portion and said remainder forming a complete customer account record.

47. The method of claim 42 wherein, at step (f)(iv)(B), said data terminal of said available operator requests an additional portion of said customer account record.

48. The method of claim 47 wherein said data terminal requests said additional portion of said customer account record in response to a predetermined key entry by said available operator.

49. The method of claim 47 wherein said data terminal requests said additional portion of said customer account record in response to receipt of said second portion of said customer account record.

50. The method of claim 42 wherein step (g) further comprises updating said customer account record to indicate that said outgoing call was not answered.

51. The method of claim 42 wherein:
step (e) further comprises monitoring said selected trunk to determine whether busy signals, unanswered ringing signals, or other call progress signals are present; and
step (g) further comprises updating said customer account record to indicate that said busy signals, said unanswered ringing signals, or said other call progress signals are present.

52. The method of claim 42 wherein:
step (a) comprises obtaining said first portion of a plurality of said customer account records; and
steps (b) through (g) are performed for each record of said plurality of customer account records.

53. The method of claim 42 wherein step (f) (v) further comprises:
(A) placing next message on said selected trunk;
(B) monitoring said selected trunk for a response to said next message;
(C) determining whether said response to said next message indicates operator assistance is required;
(D) if said operator assistance is required then proceeding to step (f)(iv)(A); and
(E) if said operator assistance is not required then providing said response to said host and proceeding to step (f)(v)(A).

54. The method of claim 53 and further comprising:
releasing said selected trunk in response to a predetermined response to said next message.

55. The method of claim 42 and further comprising:
releasing said selected trunk in response to a predetermined response to said message.

56. For use with a customer account servicing system having a host and a plurality of operator terminals, said host containing a plurality of customer account records, each operator terminal of said operator terminals having an audio communications means and a data terminal, said host using a predetermined applications program and communicating with each said data terminal using a predetermined set of instructions and a predetermined data format, said host and a plurality of said data terminal being connected to a ring network and representing nodes on said ring network, an apparatus for upgrading said existing customer account servicing system to provide for automated call placement and handling while still using said predetermined applications program, said predetermined instruction set and said predetermined data format, comprising:
trunk switching means responsive to switching control signals for connecting selected ones of a plurality of telephone trunks to selected ones of a plurality of said audio communications means;
trunk interface means responsive to interface control signals for performing selected operations on said telephone trunks; and
control means having a host port connected to said host, a ring port connected to said ring network and representing one node on said ring network, a switching control port for providing said switching control signals, and an interface control port for providing said interface control signals, said control means communicating with said host using said predetermined set of instructions and said predetermined data format, said control means obtaining at least a first portion of each record of a plurality of said customer account records from said host using said predetermined set of instructions and said predetermined data format and, for each record of said plurality of customer account records, extracting a customer telephone number from said first portion, causing said trunk interface means to place an outgoing call by dialing said customer telephone number on an available telephone trunk of said plurality of telephone trunks, is responding to said trunk interface means providing an indication that said outgoing call has been answered by causing said trunk switching means to connect said telephone trunk for said outgoing call which has been answered to an audio communications means of an available operator, requesting, using said predetermined set of instructions and said predetermined data format, said host to send at least a second portion of said record and transferring, over said ring network, using said predetermined set of instructions and said predetermined data format, at least said second portion of said record to said data terminal of said available operator.

57. For use with a customer account servicing system having a host and a plurality of operator terminals, said host containing a plurality of customer account records, each operator terminal of said operator terminals having an audio communications means and a data terminal, said host using a predetermined applications program and communicating with each said data terminal using a predetermined set of instructions and a predetermined data format, an apparatus for upgrading said customer account servicing system to provide for automated call placement and handling while still using said predetermined applications program, said predetermined instruction set and said predetermined data format, comprising:

trunk switching means responsive to switching control signals for connecting selected ones of a plurality of telephone trunks to selected ones of a plurality of said audio communications means;

trunk interface means responsive to interface control signals for performing selected operations on said telephone trunks;

control means connected to said host and a plurality of said data terminal in a predetermined configuration and communicating with said host and said plurality of said data terminal using said predetermined set of instructions and said predetermined data format, and having a switching control port for providing said switching control signals and an interface control means obtaining at least a first portion of at least one said customer account record from said host using said predetermined set of instructions and said predetermined data format and, for each said record, extracting a customer telephone number from said first portion, causing said trunk interface means to place an outgoing call by dialing said customer telephone number on an available telephone trunk of said plurality of telephone trunks, responding to said trunk interface means providing an indication that said outgoing call has been answered by causing said trunk switching means to connect said telephone trunk which has been answered to said audio communications means of an available operator and, using said predetermined set of instructions and said predetermined data format, causing said host to send at least a second portion of said record to said data terminal of said available operator.

58. The apparatus of claim 57 wherein said predetermined configuration comprises:
said host being connected to a host port of said control means; and
each said data terminal being connected to a terminal port of said control means, said control means having a plurality of said terminal port.

59. The apparatus of claim 58 wherein said control means causes said host to send said second portion to said data terminal of said available operator by sending to said host, using said predetermined set of instructions and said predetermined data format, a command to send said second portion, receiving said second portion from said host using said predetermined set of instructions and said predetermined data format, and sending at least said second portion to said data terminal using said predetermined set of instructions and said predetermined data format.

60. The apparatus of claim 59 wherein said command is identical to that command which said data terminal would send to said host to obtain said second portion.

61. The apparatus of claim 57 wherein said predetermined configuration comprises:
said host being connected to a host port of said control means; and
a ring network having a plurality of nodes, each said data terminal being a node, and a terminal port of said control means being a node.

62. The apparatus of claim 61 wherein said control means causes said host to send said second portion to said data terminal of said available operator by sending to said host, using said predetermined set of instructions and said predetermined data format, a command to send said second portion, receiving said second portion from said host using said predetermined set of instructions and said predetermined data format, and sending at least said second portion to said data terminal using said predetermined set of instructions and said predetermined data format.

63. The apparatus of claim 59 wherein said command is identical to that command which said data terminal would send to said host using said predetermined set of instructions and said predetermined data format to obtain said second portion.

64. The apparatus of claim 57 wherein said predetermined configuration comprises:
a ring network having a plurality of nodes, said host being a node, each said data terminal being a node, and a terminal port of said control means being a node.

65. The apparatus of claim 64 wherein said control means causes said host to send said second portion to said data terminal of said available operator by sending to said host, using said predetermined set of instructions and said predetermined data format, a command identical to that command which said data terminal would send to said host to obtain said second portion.

66. The apparatus of claim 64 wherein said control means causes said host to send said second portion to said data terminal of said available operator by sending, using said predetermined set of instructions and said predetermined data format, at least a third portion of said record to said data terminal, and said data terminal requests at least said second portion from said host.

67. The apparatus of claim 57 wherein said control means causes said host to send at least said second portion of said record to said data terminal of said available operator by sending a record identification number for said record to said data terminal and said data terminal requests at least said second portion of said record from said host.

68. The apparatus of claim 57 wherein said control means causes said host to send at least said second portion of said record to said data terminal of said available operator by sending to said host a command identical to that which said data terminal would send to said host to obtain at least said second portion of said record.

* * * * *